United States Patent
Moriwaki et al.

(10) Patent No.: US 11,618,816 B2
(45) Date of Patent: Apr. 4, 2023

(54) METHOD FOR FORMING A MULTILAYER COATING FILM AND MULTILAYER COATING FILM

(71) Applicant: KYOEISHA CHEMICAL CO., LTD., Osaka (JP)

(72) Inventors: Yuya Moriwaki, Nara (JP); Kosuke Asada, Nara (JP); Masaru Donkai, Nara (JP); Naomi Takenaka, Nara (JP)

(73) Assignee: KYOEISHA CHEMICAL CO., LTD., Osaka (JP)

( * ) Notice: Subject to any disclaimer, the term of this patent is extended or adjusted under 35 U.S.C. 154(b) by 41 days.

(21) Appl. No.: 16/891,351

(22) Filed: Jun. 3, 2020

(65) Prior Publication Data

US 2020/0291219 A1    Sep. 17, 2020

Related U.S. Application Data

(63) Continuation-in-part of application No. PCT/JP2019/015685, filed on Apr. 10, 2019.

(30) Foreign Application Priority Data

Apr. 16, 2018 (JP) ................. 2018-078505
Mar. 5, 2019 (JP) ................. 2019-039104

(51) Int. Cl.
*C08L 33/08* (2006.01)
*C08J 5/18* (2006.01)
*B05D 7/00* (2006.01)

(52) U.S. Cl.
CPC .............. *C08L 33/08* (2013.01); *B05D 7/532* (2013.01); *B05D 7/536* (2013.01); *C08J 5/18* (2013.01); *C08J 2333/08* (2013.01); *C08J 2479/02* (2013.01); *C08L 2203/16* (2013.01)

(58) Field of Classification Search
CPC ................. B05D 7/532; B05D 7/536
See application file for complete search history.

(56) References Cited

U.S. PATENT DOCUMENTS

| | | | |
|---|---|---|---|
| 4,557,976 A | 12/1985 | Geist et al. | |
| 4,906,693 A | 3/1990 | Craun et al. | |
| 2003/0017274 A1* | 1/2003 | Luettenberg | B05D 7/572 427/407.1 |
| 2010/0221442 A1 | 9/2010 | Adachi et al. | |
| 2015/0218405 A1* | 8/2015 | Iwata | C08G 18/227 428/423.1 |

FOREIGN PATENT DOCUMENTS

| | | |
|---|---|---|
| CA | 2 262 194 A1 | 8/1999 |
| EP | 3 623 423 A1 | 3/2020 |
| EP | 3 623 424 A1 | 3/2020 |
| JP | 6-340584 A | 12/1994 |
| JP | 0959543 A | 3/1997 |
| JP | 2001-220554 A | 8/2001 |
| JP | 2001-316637 A | 11/2001 |
| JP | 2003-119401 A | 4/2003 |
| WO | 2007/083803 A1 | 7/2007 |
| WO | 2018022780 A1 | 2/2018 |
| WO | 2018022788 A1 | 2/2018 |
| WO | 2018022804 A1 | 2/2018 |

OTHER PUBLICATIONS

International Search Report, dated Jul. 16, 2019, corresponding to International Application No. PCT/JP2019/015685.
Kadowaki, Kojiro, et al., "Development of environment corresponding aqueous paints for the vehicles", Research for Coatings, Oct. 2005, No. 144, pp. 50-54.
CN Office action, dated Aug. 25, 2022, corresponding to CN Application No. 201980005518.5.
CN Office action, dated Feb. 24, 2022, corresponding to CN Application No. 201980005518.5.
Satas, D. et al., (2001), "Application Manual of Coating Process", China Petrochemical Press, Ltd., China.
Satas, D. et al., (2001). "Construction Environmental Impact Assessment Guideline", Coatings Technology Handbook (Second Edition), China Environmental Science Publishing House, Beijing, China.
European Search Report, dated Nov. 5, 2021, corresponding to EP Application No. 19788727.6.
Decision of Rejection, dated Jan. 18, 2023, corresponding to CN Application No. 201980005518.5.
Qiang, Gao et al., "Practice and Theory of Water Resistant Bonding of Soybean Protein Based Wood Adhesive", 1st ed., p. 91, Coal Industry Press, Jun. 30, 2014.
Jingdan, Sun, "Be careful. 100 toxic substances in our lives," No. 1, p. 21, Sichuan People's Publishing House, Feb. 28, 2018.
"Ordnance Industry Science and Technology Dictionary Environmental Engineering, Anticorrosion and Packaging", Editorial Board, Dictionary of Science and Technology of Weaponry Industry, pp. 17-114, National Defense Industry Press, May 31, 1993.

* cited by examiner

*Primary Examiner* — Dah-Wei D. Yuan
*Assistant Examiner* — Kristen A Dagenais-Englehart
(74) *Attorney, Agent, or Firm* — Ladas & Parry LLP; Malcolm J. MacDonald

(57) ABSTRACT

An object of the present invention is to provide a method for forming a multilayer coating film with excellent performance such as acid resistance, by using a coating composition which is completely different from conventional clear coating compositions and cheaper than conventional non-melamine curing type, acid/epoxy type, and isocyanate type clear coating compositions. A method for forming a multilayer coating film comprising a step (1) of applying a base coating composition and a step (2) of applying a clear coating composition on a coating film formed in the step (1), wherein the clear coating composition causes a curing reaction through a transesterification reaction between a hydroxyl group and an alkyl ester group.

12 Claims, No Drawings

METHOD FOR FORMING A MULTILAYER COATING FILM AND MULTILAYER COATING FILM

This is a CIP of International Application No. PCT/JP2019/015685, filed Apr. 10, 2019, which claims priority to Japanese Patent Application No. 2018-078505, filed Apr. 16, 2018, and Japanese Patent Application No. 2019-039104, filed Mar. 5, 2019, the contents of which are incorporated by reference herein.

TECHNICAL FIELD

The present invention relates to a method for forming a multilayer coating film and a multilayer coating film.

BACKGROUND OF THE DISCLOSURE

In the fields of automotive coating and so on, a multilayer coating film having a base coating film and a clear coating film has been widely used. As a clear coating composition used in the multilayer coating film formation method, a composition comprising a hydroxyl group-containing resin and a melamine resin, a composition comprising an isocyanate group-containing resin and a hydroxyl group, and a resin composition comprising an epoxy group-containing resin and a carboxylic acid group are generally used.

However, the melamine resin is presumed as the cause of sick house syndrome because it generates formaldehyde, so that it has been restricted in uses. In addition, if it is used in a coating, a problem in acid resistance is known to occur because of its chemical structure. Automotive top coating compositions and other coating compositions are required to have the acid resistance so that such disadvantage has been sought to be improved.

Therefore, non-melamine curing systems such as an isocyanate curing system, and an acid/epoxy curing system have been replaced as a countermeasure, but the systems put a heavy burden on equipment because the resulting coating composition is toxic and has problems with storage stability. Furthermore, in the field of coating compositions, a cost reduction is also strongly required so that there is a need for coating compositions prepared by using cheaper raw materials.

On the other hand, some studies have been made on coating compositions using a transesterification reaction as a crosslinking reaction. For example, patent document 1 discloses a powder coating using a transesterification reaction as curing reaction. However, patent document 1 discloses only the use of a powder coating, and the use of general solvent-based or water-based compositions is not disclosed.

Patent document 2 discloses a coating using a transesterification reaction as curing reaction. In this document, a detailed composition of the resin to be used is not restricted, and a composition which can be suitably used for a curable composition through a transesterification reaction is not identified.

Further, patent document 3 discloses the use of a clear coating composition using a transesterification reaction as curing reaction in a forming method of a multilayer coating film. However, the coating composition disclosed in patent document 3 is not sufficient the curing performance so that it is difficult to obtain performances comparable to known clear coating compositions.

PRIOR TECHNICAL DOCUMENTS

Patent Documents

[Patent Document 1] Japanese Kokai Publication Hei9-59543
[Patent Document 2] Japanese Kokai Publication Hei2-147675
[Patent Document 3] Japanese Kokai Publication 2001-220554

SUMMARY OF INVENTION

Problems to be Solved by the Invention

In view of the above, an object of the present invention is to provide a method for forming a multilayer coating film with excellent performance such as acid resistance, by using a coating composition which is completely different from conventional clear coating compositions and, is cheaper and has better storage stability than conventional non-melamine curing type clear coating compositions.

Means for Solving Object

The present invention relates to a method for forming a multilayer coating film comprising a step (1) of applying a base coating composition and a step (2) of applying a clear coating composition on a coating film formed in the step (1), wherein the clear coating composition causes a curing reaction through a transesterification reaction between a hydroxyl group and an alkyl ester group.

Preferably, the step (1) and the step (2) are performed in a wet-on-wet manner, and after the step (2), a step (3) of curing a base coating film layer and a clear coating film layer simultaneously is performed.

The step (1) may comprise a step (1-1) of applying a first base coating composition, and a step (1-2) of applying a second base coating composition in a wet-on-wet manner.

The base coating composition may be a solvent-based base coating composition or a water-borne base coating composition.

The base coating composition is preferably a water-borne base coating composition, and the water-borne base coating composition is preferably obtained by using an amine and/or an ammonia as a basic neutralizing agent to neutralize a resin with a base, and further contains a melamine resin.

The water-borne base coating composition preferably contains the melamine resin in an amount of more than 5% by weight based on the solid content of the coating composition.

The present invention relates to a multilayer coating film formed by the above-mentioned method for forming a multilayer coating film.

Effects of the Invention

The method for forming a multilayer coating film of the present invention uses a curing system that does not generate formaldehyde in the clear coating film so that the resulting multilayer coating film is inexpensive and highly safe, and has excellent properties such as acid resistance and excellent curing performance. Further, it is preferable in that a multilayer coating film is formed with a material which is less expensive than before, and a baking temperature can be lowered.

DETAILED DESCRIPTION OF PREFERRED EMBODIMENTS

Hereinafter, the present invention will be described in detail.

The present invention relates to a method for forming a multilayer coating film having a base coating film and a clear coating film, in which a coating composition causing curing reaction through a transesterification reaction between a hydroxyl group and an alkyl ester group is used in forming the clear coating film. Also, the method of the present invention may be applied to base coating, and known clear coating compositions may be used for clear coating.

That is, a hydroxyl group and an alkyl ester group are present in film-forming components in the coating composition and crosslinks between molecules are formed and cured by transesterification reaction of these groups.

This transesterification reaction is shown in the following chemical formulas 1 to 3.

In the formula, R represents an alkyl group.

An example of a case where the ester compound acts as a crosslinking agent with a relatively low molecular weight in the above reaction is as follows.

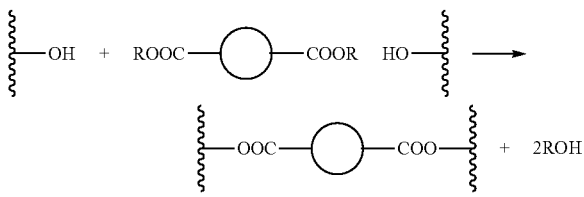

In the formula, R represents an alkyl group.

An example of the case where the compound (B) acts as a crosslinking agent with a relatively low molecular weight is as follows.

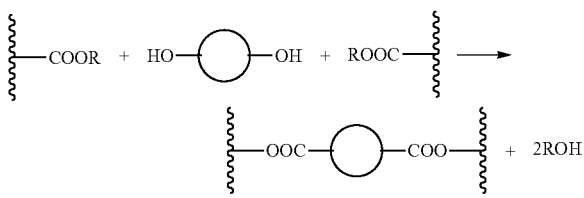

In the formula, R represents an alkyl group.

The use of such transesterification reaction of an alkyl ester for crosslinking reaction of coating composition has not been sufficiently studied so far. The present inventors have studied the practical use of coating compositions using the transesterification reaction as curing reaction. As the result, it has been found that the above-mentioned coating composition can be used for forming a clear coating film in a multilayer coating film having a base coating film and a clear coating film that widely used in the field of automotive top coating composition and so on. By this, they have found that a multilayer coating film having good performances can be formed at low cost, and the present invention has been completed.

In addition, the coating composition which uses such a transesterification reaction as curing reaction can also be used as a base coating composition. For example, a coating composition which uses a transesterification reaction as curing reaction is used for base coating, and an isocyanate type, a melamine type, an acid/epoxy type, a silane type or the like coating composition can be freely combined for clear coating, depending on the application. Further, both of solvent-based and water-based may be used.

Hereinafter, the clear coating composition will be described in detail.

In the following description, "(meth)acrylate" means acrylate and/or methacrylate. "(Meth)acrylic acid" means acrylic acid and/or methacrylic acid. "(Meth)acryloyl" means acryloyl and/or methacryloyl. "(Meth)acrylamide" means acrylamide and/or methacrylamide.

(Clear Coating Composition)

In the present invention, the coating composition used for forming the clear coating film contains a coating film-forming component having an alkyl ester group and a hydroxyl group in the coating film-forming component. Such a coating film-forming component may be a component having both a hydroxyl group and an alkyl ester group in a single component, or may be a mixture of a hydroxyl group-containing component and an alkyl ester group-containing component. A mixture of a component having both a hydroxyl group and an alkyl ester group in a single compound and further a hydroxyl group-containing component and/or an alkyl ester group-containing component may be used.

In the present invention, the alkyl ester group is not limited. However, it is more preferred to contain a tertiary alky ester group as a part or whole of the alkyl ester groups because the transesterification reaction generally tends to occur compared with a secondary alkyl ester group and a primary alkyl ester group, so that the reaction can be promptly carried out at low temperature. As the tertiary alkyl ester group, a t-butyl ester group is particularly preferable. In the present invention, it is particularly preferable that the alkyl ester group is a tertiary alkyl ester group such as a t-butyl ester group from the viewpoint that a faster reaction rate can be obtained than before and it can be cured at very low temperatures of 120° C. or less depending on its structure.

The alkyl ester group other than tertiary is not particularly limited, and those having known ester groups such as a methyl ester group, an ethyl ester group, a benzyl ester group, an n-propyl ester group, an isopropyl ester group, an n-butyl ester group, an isobutyl ester group, and sec-butyl ester group can be used.

Incidentally, it is preferable that the alkyl group has 50 or less carbon atoms. Since the alkyl group is formed as an alcohol during the transesterification reaction and is preferably volatilized, the alkyl group is more preferably one having 20 or less carbon atoms, and still more preferably 10 or less. The boiling point of the alcohol volatilizing in the curing reaction is preferably 300° C. or less, more preferably 200° C. or less.

As mentioned above, when the alkyl ester group is a tertiary alkyl ester group such as a t-butyl ester group, it is preferable because it is particularly excellent in reactivity and low temperature curability.

On the other hand, even in a thermosetting resin composition that uses a transesterification reaction of primary and secondary alkyl esters as curing reaction, which has been considered not to provide a sufficient curing reaction, use of the compound having the specified structure can realize good curing performance. From this point of view, even when it is a primary alkyl ester or a secondary alkyl ester, a resin composition with excellent curing performance may be obtained.

The clear coating composition used in the present invention may contain a coating film-forming component having one or more of the above-mentioned primary to tertiary alkyl ester groups.

In the clear coating composition, it is preferable that the molar ratio of alkyl ester group/hydroxyl group in the coating film-forming component is in the range of 50/1 to 1/50. However, considering only the crosslinking reaction, it is preferable that the ratio is close to the equivalent amount of 0.1/1 to 1/0.5, or it is slightly excess of the hydroxyl group. The molar ratio can be changed arbitrarily, for example, in consideration of the adhesion and hydrophilicity of the clear coating film, the molar ratio of hydroxyl groups may be increased, and in consideration of the hardness and Tg of the thermosetting resin, the molar ratio of the alkyl ester group may be increased.

In order to cause the transesterification reaction, it is necessary to use a transesterification catalyst. Such transesterification catalyst is not particularly limited but specifically, it may include, for example, various acidic compounds such as hydrochloric acid, sulfuric acid, nitric acid, acetic acid, phosphoric acid or sulfonic acid and the like; various basic compounds such as LiOH, KOH or NaOH, amines and the like; and various metal compounds such as PbO, zinc acetate, lead acetate, antimony trioxide, tetraisopropyl titanate, dibutyl tin dilaurate, dibutyl tin dioctate or monobutyl stannate, and the like. It is also possible to use a photoresponsive catalyst or a thermal latent catalyst which generates an acid or a base by light or heat.

Among them, as a material which can sufficiently exhibit the effect of the present invention, it is preferable to use a compound having a sulfonic acid group (dodecylbenzenesulfonic acid, phenolsulfonic acid, methanesulfonic acid, paratoluenesulfonic acid) or a compound having a group consisting of an alkali metal salt, an amine salt, and an ammonium salt of sulfonic acid.

An amount of the transesterification catalyst to be used is preferably 0.01 to 50% by weight based on the total weight of the coating film-forming components. Within such a range, it is preferable in that good curing reaction can be carried out at low temperature. The upper limit is more preferably 10% by weight, and still more preferably 5% by weight.

The form of the clear coating composition used in the present invention is not particularly limited, but it is preferably an organic solvent-based form. This is preferable in that it can be used for coating in a conventional general coating line.

The specific composition of the coating film-forming component that can be used in the clear coating composition will be described in detail below. The coating film-forming component is not limited to those described below.

(Component Having Both Alkyl Ester Group and Hydroxyl Group)

The clear coating composition used in the present invention may contain a component having both an alkyl ester group and a hydroxyl group. Examples of such a component include, but are not particularly limited to, acrylic resins, vinyl polymers, polyester resins, and esters of hydroxycarboxylic acid compounds having these functional groups.

Among them, the acrylic resin having both an alkyl ester group and a hydroxyl group is particularly preferred because it is easy to control the composition thereof, and it is easy to introduce a necessary amount of a functional group and to control the viscosity. The acrylic resin having both an alkyl ester group and a hydroxyl group can be obtained by mixing a monomer having an alkyl ester group and a monomer having a hydroxyl group at a predetermined ratio and copolymerizing by a general method.

As the above-mentioned monomer having an alkyl ester group, a great many kinds of compounds are known, but typically, compounds represented by the following general formula can be mentioned.

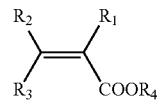

(1)

(In the formula, $R_1$, $R_2$ and $R_3$ represent hydrogen, an alkyl group, a carboxyl group, or an alkyl ester group, and $R_4$ represents an alkyl group.)

Such a compound represented by the general formula (1) may be an ester derivative of a known unsaturated carboxylic acid such as (meth)acrylic acid, crotonic acid, itaconic acid, maleic acid or fumaric acid. The alkyl group represented by the $R_4$ is most preferably t-butyl group.

The most typical example of the monomer having an alkyl ester group represented by the general formula (1) is an ester of (meth)acrylic acid and an alcohol, and examples thereof include t-butyl (meth)acrylate.

Among them, a tertiary alkyl ester such as t-butyl (meth)acrylate is most preferable from the viewpoint of reactivity of crosslinking.

T-butyl (meth)acrylate is particularly preferred because it easily causes transesterification reaction and it is a raw material that is inexpensive and easily available.

As the monomer having an alkyl ester group, an alkyl ester monomer having a chemical structure represented by the following general formula (2) may be used. The alkyl ester monomer having the structure represented by the following general formula (2) can preferably cause a good transesterification reaction even when a primary or secondary alkyl ester is used.

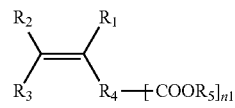

(2)

$n_1$: 1 to 10

(in the formula, $R_1$, $R_2$ and $R_3$ are the same or different and each is hydrogen, an alkyl group, a carboxyl group, an alkyl ester group or a structure represented by the following $R_4$—[COOR$_5$].

$R_4$ is aliphatic, alicyclic or aromatic alkylene group with a number of atoms of 50 or less in the main chain, which may have one or more functional groups selected from the group consisting of an ester group, an ether group, an amide group, and a urethane and may have a side chain. $R_5$ is an alkyl group having 50 or less carbon atoms.)

The monomer represented by the general formula (2) preferably has the chemical structure represented by the following general formula (3).

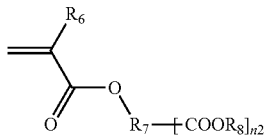

(3)

$n_2$: 1 to 10
(in the formula, $R_6$ is H or methyl group.
$R_7$ is an alkylene group with a number of atoms of 48 or less in the main chain, which may have an ester group, an ether group and/or an amide group in the main chain, and may have a side chain.
$R_8$ is an alkyl group having 50 or less carbon atoms.)
Such a compound is a derivative of (meth)acrylic acid and can be obtained by a known synthesis method using (meth) acrylic acid or derivative thereof as a raw material.

The number of atoms in the main chain of $R_7$ is more preferably 40 or less, still more preferably 30 or less, and further more preferably 20 or less. The atom that may be contained in the main chain of $R_7$ is not particularly limited, and an oxygen atom, a nitrogen atom, a sulfur atom, a silicon atom and the like in addition to the carbon atom may be contained. More specifically, in the main chain of $R_7$, an ether group, an ester group, an amino group, an amide group, a thioether group, a sulfonate group, a thioester group, a siloxane group, etc. in addition to an alkyl group may be contained.

More specifically, examples of the structure represented by the general formula (3) include a compound represented by the following general formula (4).

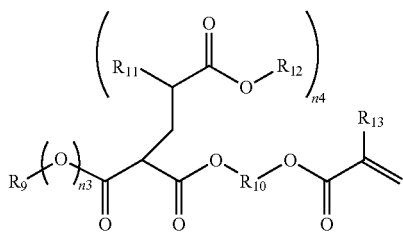

(4)

(in the formula, $R_9$ is an alkyl group having 1 to 50 carbon atoms;
$R_{10}$ is an alkylene group with a number of atoms of 44 or less in the main chain, which may have an ester group, an ether group and/or an amide group in the main chain, and may have a side chain;
$R_{11}$ is H or a methyl group;
$R_{12}$ is an alkyl group having 50 or less carbon atoms;
$R_{13}$ is H or a methyl group;
$n_3$ is 0 or 1; and
$n_4$ is 1 or 2.)

The compound represented by the general formula (3) can be synthesized by reacting a compound which generates an active anion such as a malonic acid ester or an acetoacetic acid ester having an unsaturated bond in the molecule with an unsaturated compound having an alkyl ester group.

That is, malonic acid esters and acetoacetic acid esters have a methylene group interposed between carboxy carbons, and this methylene group is easily anionized and widely known as a group which readily produces anion reaction. A compound having an unsaturated bond in alkyl group of malonic acid ester or acetoacetic acid ester (for example, ester compounds of malonic acid or acetoacetic acid with an unsaturated monomer having a hydroxyl group as detailed below as a hydroxyl group-containing vinyl monomer) is reacted with an alkyl ester compound having an unsaturated group to synthesis a compound having both of an unsaturated group and an alkyl ester group.

Only the alkyl ester group in the compound having such a structure can be easily changed by using a raw material used widely, and as a result, the curing reactivity can be easily adjusted. In addition, it is particularly preferable in that the curing reactivity can be adjusted by changing the reaction ratio to an active methylene group.

The compound which can be used as the "alkyl ester compound having an unsaturated group" used in the above reaction is not particularly limited, and examples thereof include (meth) acrylic acid alkyl ester, methylene malonate alkyl ester, lactone compounds having an unsaturated group (for example, γ-crotonolactone, 5,6-dihydro-2H-pyran-2-one) and the like can be used.

The reaction can be carried out under basic conditions, and for example, can be carried out in an organic solvent in the presence of a crown ether of alkali metal salt.

An example of such a synthesis reaction is shown below.

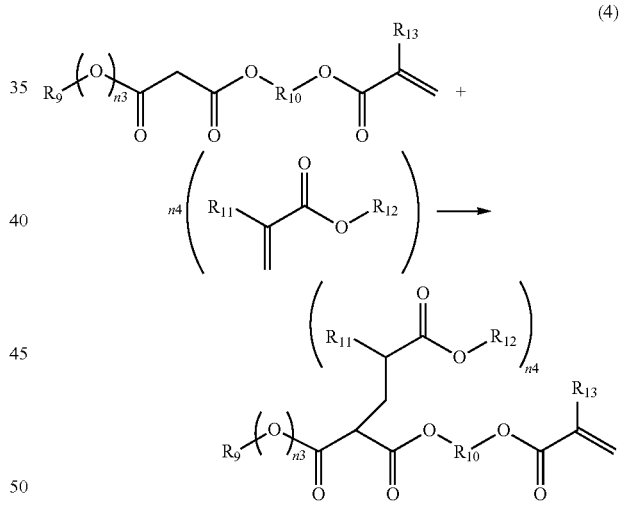

(4)

It can also be obtained by esterification of a carboxylic acid corresponding to the alkyl ester compound represented by the above general formula (2).

That is, the compound represented by the following general formula (2-2) is a carboxylic acid corresponding to the alkyl ester compound represented by the general formula (2).

(2-2)

$n_1$: 1 to 10

(in the formula, $R_1$, $R_2$, and $R_3$ are the same or different, and each represents a hydrogen, an alkyl group, a carboxyl group, an alkyl ester group or a structure represented by the following $R_4$—[COOH]$n_1$;

$R_4$ is an aliphatic, an alicyclic or an aromatic alkylene group with a number of atoms of 50 or less in the main chain, which may have one or more functional groups selected from the group consisting of an ester group, an ether group, an amide group, and a urethane and may have a side chain.)

Known compounds exist as the compound represented by the general formula (2-2). Such known compounds can also be converted to unsaturated group-containing ester compounds of the present invention by carrying out a usual esterification reaction (for example, reaction with an alcohol corresponding to the alkyl group of the target alkyl ester).

Examples of specific chemical structures of compounds that can be synthesized by the methods exemplified above are shown below. It is to be noted that the present invention is not limited to the compounds exemplified below.

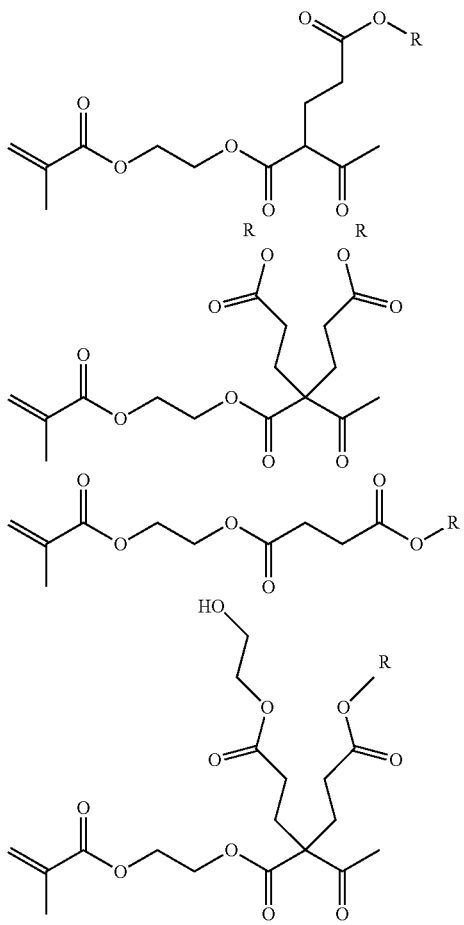

In the formula, R represents an alkyl group.

Such a compound is preferable in that it can be cured at a low temperature because of high transesterification reactivity.

An amount of the structural unit having the alkyl ester as a skeleton is preferably 1% by weight or more in the polymer. When it is less than 1% by weight, the amount of the crosslinkable functional group becomes small, so that the curing reaction does not proceed sufficiently, which is not preferable. The amount is more preferably 5% by weight or more, and still more preferably 10% by weight or more.

In the production of the acrylic resin having both an ester group and a hydroxyl group, it is preferable to use a hydroxyl group-containing vinyl monomer for introducing the hydroxyl group.

Representative examples of the hydroxyl group-containing vinyl monomers are exemplified below; various hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether or 6-hydroxyhexyl vinyl ether; addition reaction products of these various vinyl ethers and ε-caprolactone;

various hydroxyl group-containing allyl ethers such as 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether or 6-hydroxyhexyl (meth)allyl ether; addition reaction products of these various allyl ethers and ε-caprolactone;

various hydroxyl group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono (meth)acrylate, or polypropylene glycol mono (meth)acrylate; and main components of addition reaction of these various (meth)acrylates and ε-caprolactone.

An amount of the structural unit having the hydroxyl group-containing vinyl monomer as a skeleton is preferably 1% by weight or more in the polymer. When it is less than 1% by weight, the amount of the crosslinkable functional group becomes small, so that the curing reaction does not proceed sufficiently, which is not preferable. The amount is more preferably 5% by weight or more, and still more preferably 10% by weight or more.

The acrylic resin may partially have a structural unit having a monomer other than the alkyl group-containing monomer and the hydroxyl group-containing monomer as a skeleton.

The structural unit having a monomer other than the alkyl group-containing monomer and the hydroxyl group-containing monomer as a skeleton in the acrylic resin is not particularly limited but may include monomers as described in detail below.

Various α-olefins such as ethylene, propylene, or butane-1;

various halogenated olefins except fluoroolefin such as vinyl chloride or vinylidene chloride, (meth)acrylates having 1 to 18 carbon atoms, such as various alkyl (meth)acrylates as well as various cycloalkyl (meth)acrylates, aralkyl (meth)acrylates, phenyl (meth)acrylates or substituted phenyl group-containing (meth)acrylate;

various aromatic vinyl compounds such as styrene, α-methylstyrene or vinyltoluene;

various amino group-containing amide unsaturated monomers such as N-dimethylaminoethyl (meth)acrylamide, N-diethylaminoethyl (meth)acrylamide, N-dimethylaminopropyl (meth)acrylamide or N-diethylaminopropyl (meth)acrylamide; various dialkylaminoalkyl (meth)acrylates such as dimethylaminoethyl (meth)acrylate or diethylaminoethyl (meth)acrylate;

various amino group-containing monomers such as tert-butylaminoethyl (meth)acrylate, tert-butylaminopropyl (meth)acrylate, aziridinyl ethyl (meth)acrylate, pyrrolidinylethyl (meth)acrylate or piperidinylethyl(meth)acrylate;
various carboxyl group-containing monomers such as (meth)acrylic acid, crotonic acid, itaconic acid, maleic acid or fumaric acid;
various epoxy group-containing monomers such as glycidyl (meth)acrylate, β-methylglycidyl (meth)acrylate or (meth) allyl glycidyl ether;
mono- or diesters of various α, β-unsaturated dicarboxylic acids such as maleic acid, fumaric acid or itaconic acid with monohydric alcohols having 1 to 18 carbon atoms; various hydrolyzable silyl group-containing monomers such as vinyltrimethoxysilane, vinyltriethoxysilane, vinyltripropoxysilane, vinylmethyldiethoxysilane, vinyltris(β-methoxyethoxy) silane, allyltrimethoxysilane, trimethoxysilylethyl vinyl ether, triethoxysilylethyl vinyl ether, methyldimethoxysilyl ethyl vinyl ether, trimethoxysilylpropyl vinyl ether, triethoxysilylpropyl vinyl ether, methyldiethoxysilylpropyl vinyl ether, γ-(meth)acryloyloxypropyltrimethoxysilane, γ-(meth)acryloyloxypropyltriethoxysilane or γ-(meta)acryloyloxypropylmethyldimethoxysilane;
various fluorine-containing α-olefins such as vinyl fluoride, vinylidene fluoride, trifluoroethylene, tetrafluoroethylene, chlorotrifluoroethylene, bromotrifluoroethylene, pentafluoropropylene or hexafluoropropylene;
various fluorine atom-containing monomers such as various perfluoroalkyl perfluorovinyl ether or (per) fluoroalkyl vinyl ether (provided that the alkyl group has 1 to 18 carbon atoms) including trifluoro methyl trifluorovinyl ether, pentafluoroethyl trifluorovinyl ether or heptafluoropropyl trifluorovinyl ether;
various alkyl vinyl ethers or substituted alkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, 2-ethylhexyl vinyl ether, chloromethyl vinyl ether, chloroethyl vinyl ether, benzyl vinyl ether or phenylethyl vinyl ether,
various cycloalkyl vinyl ethers such as cyclopentyl vinyl ether, cyclohexyl vinyl ether or methyl cyclohexyl vinyl ether;
various aliphatic carboxylic acid vinyls such as vinyl 2,2-dimethyl propanoate, vinyl 2,2-dimethyl butanoate, vinyl 2,2-dimethyl pentanoate, vinyl 2,2-dimethyl hexanoate, vinyl 2-ethyl-2-methyl butanoate, vinyl 2-ethyl-2-methyl pentanoate, vinyl 3-chloro-2,2-dimethyl propanoate and the like, as well as vinyl acetate, vinyl propionate, vinyl butyrate, vinyl isobutyrate, vinyl caproate, vinyl caprylate, vinyl caprate or vinyl laurate, $C_9$ branched aliphatic carboxylic acid vinyl, $C_{10}$ branched aliphatic carboxylic acid vinyl, $C_{11}$ branched aliphatic carboxylic acid vinyl or vinyl stearate;
Vinyl esters of carboxylic acids having a cyclic structure such as vinyl cyclohexane carboxylate, vinyl methyl cyclohexane carboxylate, vinyl benzoate or vinyl p-tert-butylbenzoate.

An amount of such other components is not particularly limited but is preferably 70% by weight or less.

The acrylic resin having both an alkyl ester group and a hydroxyl group preferably has a glass transition temperature of 80° C. or lower. Tertiary alkyl (meth)acrylate has a relatively high glass transition temperature among various acrylates. Therefore, the glass transition temperature can be brought to 80° C. or lower by using other structural units based on other monomers in combination. The glass transition temperature is more preferably 50° C. or lower.

According to the investigation by the inventors of the present invention, when the clear coating composition is organic solvent-based, if the glass transition temperature of the acrylic resin exceeds 80° C., the transesterification reactivity is slow and it tends to be difficult to form a coating film by a low temperature curing. Furthermore, even in the obtained coating film, sufficient crosslinking cannot be obtained and the performance as a coating film cannot be sufficiently secured in all cases.

The reason why such a difference occurs between the case of the powder coating described in the reference 1 and the case of the organic solvent-based or the water-based coating composition of the present invention is thought that when the Tg is lowered, the alkyl ester groups and the hydroxyl groups that are reaction points become easy to move and the reaction proceeds. In addition, when an ester group is added to a terminal having a longer side chain, the reactivity is improved by increasing the degree of freedom of the reaction point.

Further, setting the glass transition temperature to 80° C. or lower is also preferable from the viewpoint of good leveling property, crosslinking property and film property.

In the present specification, the glass transition temperature was calculated by setting the weight ratio of the monomers in each polymer portion according to the following Fox formula.

$$1/Tg=(W_1/Tg_1)+(W_2/Tg_2)+\ldots+(W_m/Tg_m)$$

$$W_1+W_2+\ldots+W_m=1$$

In the formula, Tg represents the glass transition temperature of the polymer portion, and $Tg_1$, $Tg_2$, ..., $Tg_m$ represents the glass transition temperature of each polymerizable monomer. $W_1$, $W_2$, ..., Wm represents the weight ratio of each polymerizable monomer.

As is clear from the above Fox equation, in order to bring the glass transition temperature of the acrylic resin to 80° C. or lower, it is preferable to use the polymerizable monomer having a low glass transition temperature in combination with the alkyl (meth)acrylate. Examples of such monomers include 2-ethylhexyl methacrylate, isodecyl methacrylate, n-lauryl methacrylate, alkyl (C12-13)methacrylate, isoamyl acrylate, lauryl acrylate, ethoxydiethylene glycol acrylate, 2-ethylhexyl glycol acrylate, methoxyethylene glycol acrylate, methoxydipropylene glycol acrylate, phenoxyethyl acrylate, phenoxydiethylene glycol acrylate, phenoxypolyethylene glycol acrylate, m-phenoxybenzyl acrylate, tetrahydrofurfuryl acrylate, 2-acryloyloxyethyl succinic acid, polyethylene glycol diacrylate, benzyl acrylate and others.

Further, as described above, t-butyl (meth)acrylate has high glass transition temperature. Therefore, when t-butyl (meth)acrylate is used as (meth)acrylic acid alkyl ester, the content in the resin is preferably 80% by weight or less in order to bring the glass transition point to 80° C. or lower, more preferably 50% by weight or less, and most preferably 30% by weight or less.

The acrylic resin having both an alkyl ester group and a hydroxyl group preferably has a number average molecular weight of 1,000 to 100,000. The number average molecular weight is a value of a molecular weight measured by gel permeation chromatography (GPC) in terms of polystyrene.

A method for producing the acrylic resin having both an alkyl ester group and a hydroxyl group is not particularly limited, and the acrylic resin having both an alkyl ester group and a hydroxyl group can be produced by polymerization by a known method. More specifically, mention may be made of polymerization methods such as a solution polymerization method in an organic solvent, an emulsion polymerization method in water, a miniemulsion polymerization method in water, an aqueous solution polymerization method, a suspension polymerization method, a UV curing method, and the like.

Further, it may be water-borne one obtained by dispersing a polymer in water after a solution polymerization in an organic solvent is carried out, or may be one obtained by dissolving a resin, which is obtained by polymerization in water, in an organic solvent.

In addition to the acrylic resin described above, a low molecular weight compound having both a hydroxy group and an alkyl ester group can also be used.

More specifically, alkyl esters of various hydroxycarboxylic acids can be used.

Specific examples include compounds obtained by alkylesterifying a carboxyl group such as lactic acid, 3-hydroxybutanoic acid, 3-hydroxy-4-ethoxybenzoic acid, tartaric acid, citric acid, and amino acids.

(Alkyl Ester Group-Containing Compound)

As described above, the clear coating composition of the present invention may be a mixture of an alkyl ester group-containing component and a hydroxyl group-containing component as a coating film-forming component.

The alkyl ester group-containing compound that can be used in such a composition is described in detail below.

(A-1) (Polymer Having a Monomer Having an Alkyl Ester Group and a Polymerizable Unsaturated Bond as a Part or all of the Structural Units)

Such a polymer is a polymer having an ester group and no hydroxyl group. As such a polymer, a resin similar to the above-mentioned acrylic resin having an alkyl ester group and a hydroxyl group can be used except that the hydroxyl group-containing vinyl monomer is not used.

Such a compound is preferable in that a compound having two or more alkyl ester groups in the molecule can be obtained at low cost with a general-purpose material.

Also, Tg may be adjusted by copolymerizing t-butyl (meth)acrylate with other monomers. In this case, it is preferable to set Tg at 80° C. or lower.

In addition to the compound represented by the general formula (1), the monomer having an alkyl ester group and a polymerizable unsaturated bond may be a compound in which a polymerizable unsaturated bond and an ester group are bonded via a linking group. As such a monomer, other monomers exemplified in "component having both an ester group and a hydroxyl group" can be used in the same ratio.

(A-2) Compound Obtained by Addition Reaction Between a Compound Having an Active Methylene Group and a Vinyl Group The compound having an active methylene group represented by the following general formula (5) causes an addition reaction with a vinyl group.

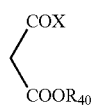

(5)

(in the formula, $R_{40}$ represents a primary to tertiary alkyl group having 50 or less carbon atoms.
X represents an $OR_{40}$ group or a hydrocarbon group having 5 or less carbon atoms. When two $R_{40}$ are present in one molecule, these $R_{40}$ may be the same or different.)

Although the structure of $R_{40}$ is not particularly limited, but those having a known ester group such as methyl ester group, ethyl ester group, benzyl ester group, n-propyl ester group, isopropyl ester group, n-butyl ester group, isobutyl ester group, and sec-butyl ester group can be used.

Specific examples of such a compound having an active methylene group include malonic acid esters and acetoacetic acid esters. Compounds obtained by adding these compounds to a vinyl compound can be used.

A compound having an active methylene group can be added to a double bond by a Michael addition reaction. A general Michael addition reaction using such a compound having an active methylene group is represented by the following formula.

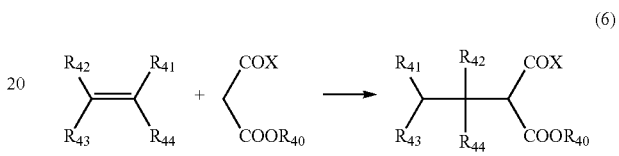

(6)

In the above reaction, both the two hydrogens of the active methylene group cause a Michael addition reaction, whereby a compound represented by the following formula (6-1) can be obtained.

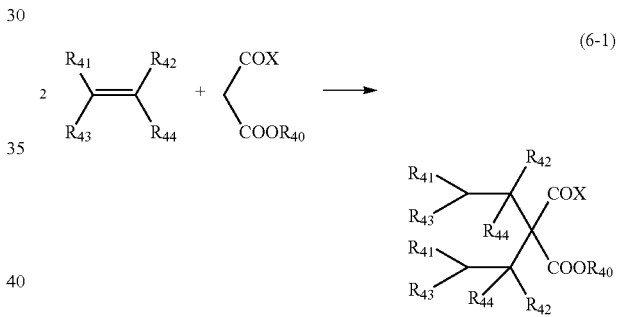

(6-1)

The compound obtained by such a reaction has a structure represented by the general formula (6) and/or a structure represented by the general formula (6-1). The compound has two or more alkyl ester groups so it can be particularly preferably used for the purpose of the present invention.

In particular, when (meth)acrylic acid or a derivative thereof is used as the vinyl compound of the above general formula, the following reaction occurs.

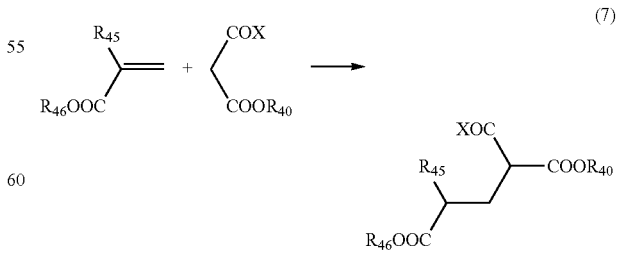

(7)

In the above general formula, $R_{40}$ represents a primary to tertiary alkyl group having 50 or less carbon atoms.
$R_{45}$ represents a hydrogen or a methyl group.

$R_{46}$ is not particularly limited, and may be any functional group depending on the purpose.

In the above reaction, both of the two hydrogens of the active methylene group cause a Michael addition reaction, whereby a compound represented by the following general formula (8) can be obtained.

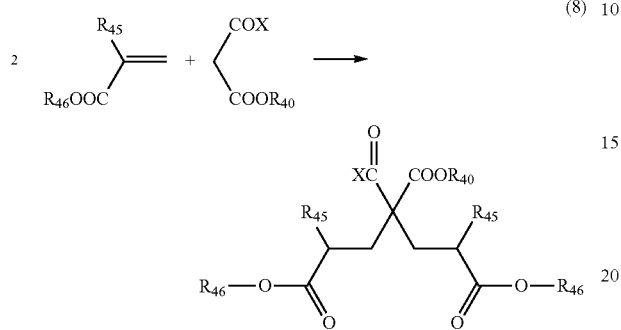

The compound represented by the general formula (8) can be obtained by adjusting the molar ratio of the (meth) acrylate and the active methylene compound in the mixing of the raw materials. Further, by adjusting these molar ratios, a mixture of the compound represented by the general formula (7) and the compound represented by the general formula (8) can be obtained.

The ester compound obtained by such a reaction will have a structural unit represented by any of the following structures in the molecule.

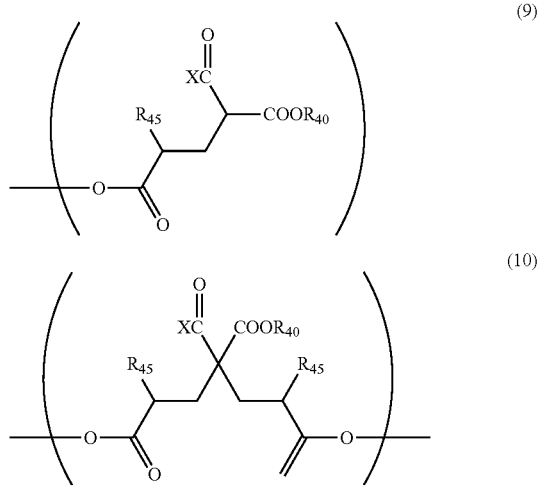

In the above-described reaction, by using an acrylic acid derivative having two or more unsaturated bonds as a raw material, an ester compound having two or more of the structure represented by the general formula (9) and/or (10) in the molecule can be obtained.

That is, a compound having the functional group, which is a compound having a structure represented by any of the following general formulas, can be preferably used in the present invention.

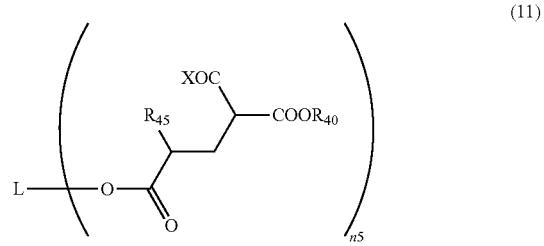

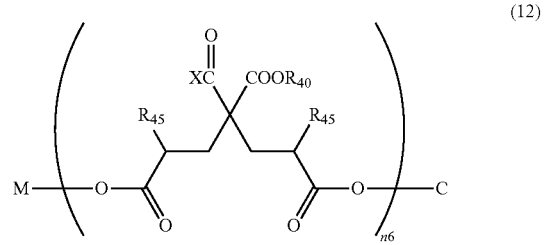

Such a compound is preferable because it has high transesterification reactivity and can obtain good curability because of many COOR groups in the molecule.

Most preferably, $n_5$ and $n_6$ in the above general formula are 2 to 12. L and M are not particularly limited as long as the compound has a molecular weight of 3000 or less, and represent a hydrocarbon group which may has an arbitrary functional group such as a hydroxyl group, an ester group, and an ether group.

The compound obtained by the addition reaction of the compound having an active methylene group with a vinyl group may be one having two or more structures represented by the general formula (11) and/or the general formula (12) in one molecule, which is obtained by using a compound having two or more unsaturated bonds in one molecule as a raw material.

Many compounds having a structure derived from a ester of a compound having an active methylene group are known, but the compound having the above structure is particularly preferred because the addition reaction of malonic acid ester or acetoacetic acid ester with vinyl group can be easily promoted, and the compound can be easily synthesized, and the ester group number can be adjusted by selecting the starting raw material so that the curing performances and the resin performances after curing can be easily adjusted.

Specifically, dimethyl malonate, diethyl malonate, di-n-butyl malonate, methyl acetoacetate, ethyl acetoacetate and the like can be suitably used.

Such a compound is obtained by performing a Michael addition reaction with a compound having an active methylene group using various (meth)acrylic acid derivatives having two or more unsaturated bonds as raw materials. The "(meth)acrylic acid derivative having one or more unsaturated bonds" is not particularly limited, and examples thereof include the following.

Examples of (meth)acrylate having a functional group include methyl (meth)acrylate, ethyl (meth)acrylate, isopropyl (meth)acrylate, n-butyl (meth)acrylate, isobutyl (meth)acrylate, sec-butyl (meth)acrylate, t-butyl (meth)acrylate and the like.

Examples of the (meth)acrylate having two functional groups include 1,4-butanediol di(meth)acrylate, 1,3-butanediol di(meth)acrylate, 1,6-hexanediol di(meth)acrylate, ethylene glycol di(meth)acrylate, diethylene glycol di(meth)

acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, neopentyl glycol di(meth)acrylate, hydroxypivalic acid neopentylglycol di(meth)acrylate, 1,6-hexanediol di(meth)acrylate, 1,9-nonanediol di(meth)acrylate, 1,10-decanediol di(meth)acrylate, glycerin di(meth)acrylate, dimethylol-tricyclodecane di(meth)acrylate (DCP-A), EO adduct diacrylate of bisphenol A (Kyoeisha Chemical Co., Ltd.; Light Acrylate BP-4EA, BP-10EA), and PO adduct diacrylate of bisphenol A (Kyoeisha Chemical Co., Ltd.; BP-4PA, BP-10PA). Among them, PO adduct diacrylate of bisphenol A (Kyoeisha Chemical Co., Ltd.; BP-4PA), dimethylol-tricyclodecane di(meth)acrylate (DCP-A) and the like can be preferably used.

Examples of the (meth)acrylate having three functional groups include trimethylolmethane tri(meth)acrylate, trimethylolpropane tri(meth)acrylate, trimethylolpropane ethylene oxide-modified tri(meth)acrylate, trimethylolpropane propylene oxide-modified tri(meth)acrylate, pentaerythritol tri(meth)acrylate, glycerin propoxy tri(meth)acrylate, tris(2-(meth)acryloyloxyethyl)isocyanurate and the like. Among them, trimethylolpropane trimethacrylate, pentaerythritol trimethacrylate and the like can be preferably used.

Examples of the (meth)acrylate having four functional groups include dipentaerythritol tetra(meth)acrylate, pentaerythritol tetra(meth)acrylate, pentaerythritol ethylene oxide-modified tetra(meth)acrylate, pentaerythritol propylene oxide-modified tetra(meth)acrylate, and ditrimethylolpropane tetra(meth) acrylate. Among them, ditrimethylolpropane tetra(meth)acrylate, pentaerythritol tetra(meth) acrylate and the like can be preferably used.

Examples of (meth) acrylates having four or more functional groups include polyfunctional (meth)acrylates such as pentaerythritol tetra(meth)acrylate, pentaerythritol ethylene oxide-modified tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, propionic acid-modified dipentaerythritol penta(meth)acrylate, dipentaerythritol hexa(meth)acrylate, ditrimethylolpropane hexa(meth)acrylate, and hexa(meth)acrylate of caprolactone modified dipentaerythritol.

Specific examples of the compounds corresponding to the compounds described above are shown below.

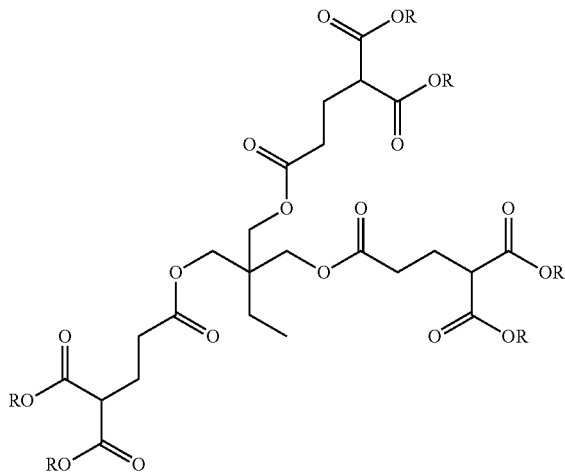

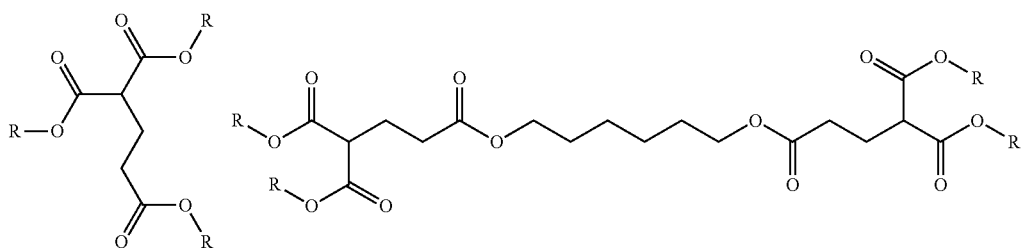

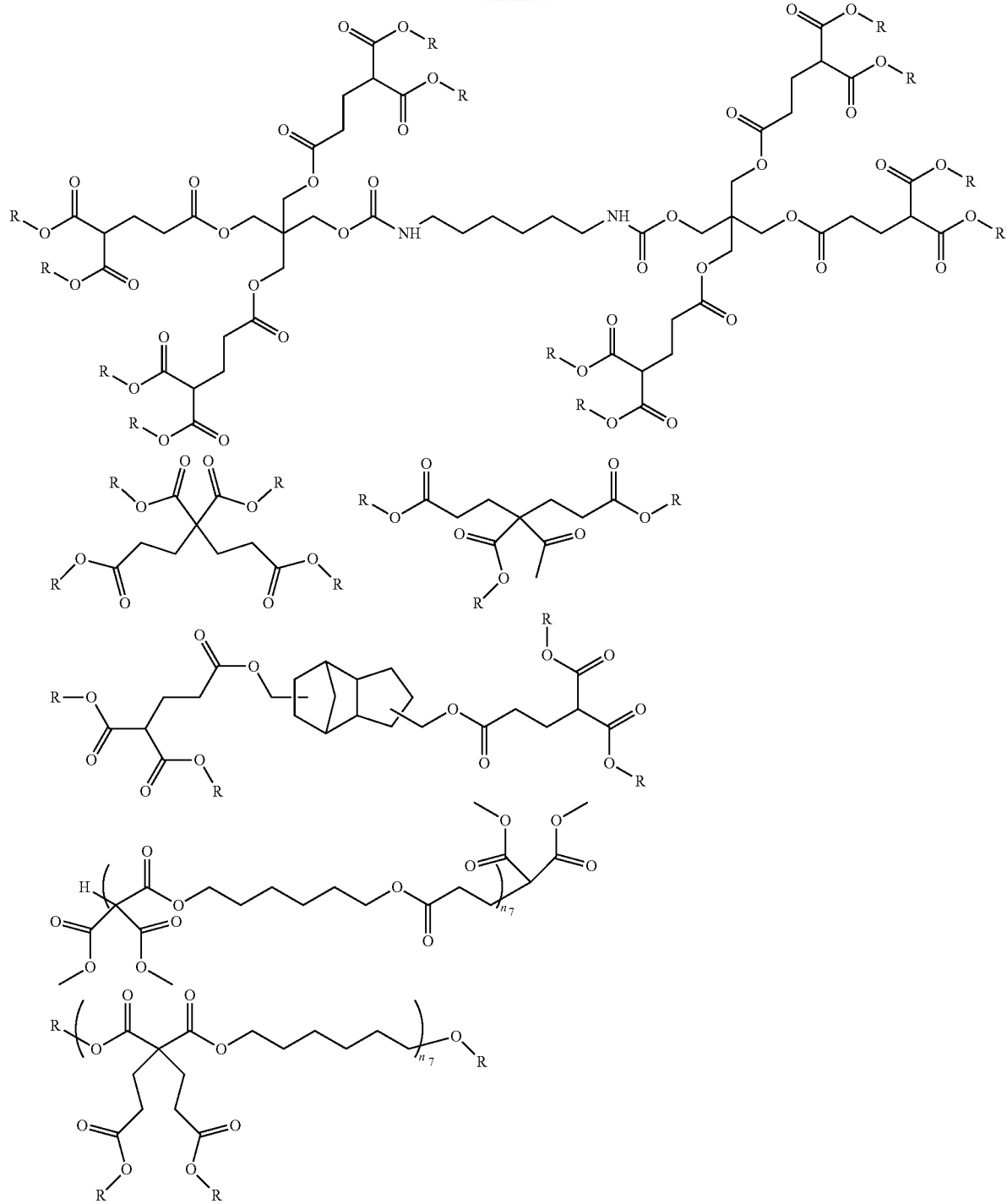

In the formula, R represents the same or different alkyl groups. $n_7$ represents 1 to 10.

The compound is preferably a compound in which three or more alkyl esters serving as crosslinking points are present in the molecule. That is, the larger the number of alkyl ester groups in the molecule, the higher the crosslinking density of the cured resin, which is preferable in that the hardness of the cured product is good and a cured product with excellent physical properties can be obtained.

The alkyl ester is more preferably 5 or more in the molecule.

The compounds described in the (A-2) can also cause a favorable transesterification reaction even when the alkyl ester group is a primary or a secondary alkyl.

(A-3) (Alkyl Ester of Polyfunctional Carboxylic Acid)

A compound obtained by reacting a polyfunctional carboxylic acid with an alcohol can also be used as the alkyl ester compound in the clear coating composition of the present invention. Such a reaction can be represented by the following general formula.

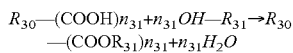

$$R_{30}\text{—}(COOH)_{n_{31}} + n_{31}OH\text{—}R_{31} \rightarrow R_{30}\text{—}(COOR_{31})_{n_{31}} + n_{31}H_2O$$

(In the formula, $n_{31}$ is preferably an integer of 1 to 10. In the above general formula, $R_{30}$ and $R_{31}$ represent an alkyl group having 50 or less carbon atoms. $R_{30}$ and $R_{31}$ are not particularly limited, and may be branched or may have an arbitrary functional group.)

Various polyfunctional carboxylic acids are general purpose raw materials widely and inexpensively provided in many applications such as polyester raw materials, polyamide raw materials, neutralizing agents, synthetic raw materials and the like. Compounds obtained by alkyl esterification of such polyfunctional carboxylic acids by a known method can also be used in the present invention. The esterification can be carried out by the above-mentioned alkyl group having 50 or less carbon atoms.

When such a compound is used as the ester compound (A), it can be esterified inexpensively by a known method and a polyvalent ester group can be introduced with a relatively low molecular weight. Further, by esterification, the compatibility with an organic solvent is improved, so that it is preferred that it can be suitably used.

The polyfunctional carboxylic acid to be used here is not particularly limited and, for example, one having a carbon number of 50 or less can be used.

More specifically, the following compounds can be mentioned;
aliphatic polyvalent carboxylic acids such as malonic acid, succinic acid, glutaric acid, adipic acid, pimelic acid, suberic acid, azelaic acid, sebacic acid, undecanedioic acid, dodecanedioic acid, brassylic acid, octadecanedioic acid, citric acid, butanetetracarboxylic acid and the like; alicyclic polyvalent carboxylic acids such as 1,2-cyclohexane dicarboxylic acid, 1,3-cyclohexane dicarboxylic acid, 1,4-cyclohexane dicarboxylic acid, 4-cyclohexene-1,2-dicarboxylic acid, 3-methyl-1,2-cyclohexane dicarboxylic acid, 4-methyl-1,2-cyclohexane dicarboxylic acid, 1,2,4-cyclohexane tricarboxylic acid, 1,3,5-cyclohexane tricarboxylic acid and the like;
aromatic polyvalent carboxylic acids such as phthalic acid, isophthalic acid, terephthalic acid, naphthalene dicarboxylic acid, 4,4'-biphenyl dicarboxylic acid, trimellitic acid, pyromellitic acid and the like; fatty acids such as coconut oil fatty acid, cottonseed oil fatty acid, hemp oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and the like; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, 10-phenyloctadecanoic acid and the like; and hydroxycarboxylic acids such as lactic acid, 3-hydroxybutanoic acid, 3-hydroxy-4-ethoxybenzoic acid and the like.

In the present invention, the compound having two or more alkyl ester groups described above may be used in combination. Further, acid anhydrides of these compounds may be used as raw materials.

The alkyl ester of polyfunctional carboxylic acid corresponding to the above (A-3) preferably has a molecular weight of 10,000 or less. It is preferable in view of the fact that molecules are easy to move and curing progresses. The molecular weight can be made lower molecular weight such as 6,000 or less, 4000 or less, and 2000 or less.

(Polyol Compound)

Hereinafter, the polyols that can be used in the clear coating composition used in the method for forming a multilayer coating film of the present invention will be described in detail.

The polyol that can be used in the clear coating composition is not particularly limited, and examples thereof include acryl polyol, polyester polyol, polyether polyol, polycarbonate polyol, polyurethane polyol, and the like. Two or more of them may be used at the same time.

Among these, it is particularly preferable to use an acrylic polyol and/or a polyester polyol.

As the acrylic polyol and/or polyester polyol used here, resins widely used in the field of coatings can be used.

These will be described in detail below.

(O-1) Acrylic Polyol

The acrylic polyol can be produced, for example, by copolymerizing a hydroxyl group-containing vinyl monomer and other polymerizable unsaturated monomer ($c_2$) copolymerizable with the above hydroxyl group-containing vinyl monomer by a known method. More specifically, there can be mentioned polymerization methods such as a solution polymerization method in an organic solvent, an emulsion polymerization method in water, a miniemulsion polymerization method in water, an aqueous solution polymerization method, or the like.

The hydroxyl group-containing vinyl monomer is a compound having one or more hydroxyl groups and polymerizable unsaturated bonds respectively in one molecule.

As the hydroxyl group-containing vinyl monomer, those described above can be used.

Examples of the other polymerizable unsaturated monomer copolymerizable with the hydroxyl group-containing vinyl monomer include the following monomers (i) to (xix), and the like, and any combination thereof.

(i) Alkyl or cycloalkyl (meth)acrylate: methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate, etc.

(ii) Polymerizable unsaturated monomer having an isobornyl group:
isobornyl (meth)acrylate, etc.

(iii) Polymerizable unsaturated monomer having an adamantyl group:
adamantyl (meth)acrylate, etc.

(iv) Polymerizable unsaturated monomer having a tricyclodecenyl group:
tricyclodecenyl (meth)acrylate, etc.

(v) Aromatic ring-containing polymerizable unsaturated monomer:
benzyl (meth)acrylate, styrene, α-methylstyrene, vinyltoluene, etc.

(vi) Polymerizable unsaturated monomer having an alkoxysilyl group:
vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, etc.

(vii) Polymerizable unsaturated monomer having a fluorinated alkyl group:
perfluoroalkyl (meth)acrylates such as perfluorobutyl ethyl (meth)acrylate and perfluorooctylethyl (meth)acrylate; fluoroolefins, etc.
(viii) Polymerizable unsaturated monomer having a photopolymerizable functional group such as a maleimide group.
(ix) Vinyl compound:
N-vinyl pyrrolidone, ethylene, butadiene, chloroprene, vinyl propionate, vinyl acetate etc.
(x) Carboxyl group-containing polymerizable unsaturated monomer:
(meth)acrylic acid, maleic acid, crotonic acid, β-carboxyethyl acrylate, etc.
(xi) Nitrogen-containing polymerizable unsaturated monomer: (meth)acrylonitrile, (meth)acrylamide, N, N-dimethylaminoethyl (meth)acrylate, N, N-diethylaminoethyl (meth)acrylate, N, N-dimethylaminopropyl (meth)acrylamide, methylene bis (meth)acrylamide, ethylenebis (meth)acrylamide, adducts of glycidyl (meth)acrylate and an amine compound, etc.
(xii) Polymerizable unsaturated monomer having two or more polymerizable unsaturated groups in one molecule:
allyl (meth)acrylate, 1,6-hexanediol di(meth)acrylate, etc.
(xiii) Epoxy group-containing polymerizable unsaturated monomer:
glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, etc.
(xiv) (Meth)acrylate having a polyoxyethylene chain whose molecular terminal is an alkoxy group:
(xv) Polymerizable unsaturated monomer having a sulfonic acid group:
2-acrylamido-2-methylpropanesulfonic acid, 2-sulfoethyl (meth)acrylate, allylsulfonic acid, 4-styrenesulfonic acid and the like; sodium salts and ammonium salts etc. of these sulfonic acids.
(xvi) Polymerizable unsaturated monomer having a phosphoric acid group:
acid phosphoxyethyl (meth)acrylate, acid phosphoxypropyl (meth)acrylate, acid phosphoxy poly(oxyethylene)glycol (meth)acrylate, acid phosphoxy poly(oxypropylene)glycol (meth)acrylate, etc.
(xvii) Polymerizable unsaturated monomer having an ultraviolet absorbing functional group: 2-hydroxy-4-(3-methacryloyloxy-2-hydroxypropoxy) benzophenone, 2-hydroxy-4-(3-acryloyloxy-2-hydroxypropoxy) benzophenone, 2,2'-dihydroxy-4-(3-methacryloyloxy-2-hydroxypropoxy) benzophenone, 2,2'-dihydroxy-4-(3-acryloyloxy-2-hydroxypropoxy) benzophenone, 2-(2'-hydroxy-5'-methacryloyloxyethylphenyl)-2H-benzotriazole, etc.
(xviii) Ultraviolet stable polymerizable unsaturated monomer:
4-(meth)acryloyloxy-1,2,2,6,6-pentamethylpiperidine,
4-(meth)acryloyloxy-2,2,6,6-tetramethylpiperidine,
4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine,
4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like.
(xix) Polymerizable unsaturated monomer having a carbonyl group:
acrolein, diacetone acrylamide, diacetone methacrylamide, acetoacetoxyethyl methacrylate, formylstyrene, vinyl alkyl ketone having about 4 to about 7 carbon atoms (for example, vinyl methyl ketone, vinyl ethyl ketone, vinyl butyl ketone), and etc.

In the present specification, "polymerizable unsaturated group" means an unsaturated group capable of radical polymerization or ionic polymerization. Examples of the polymerizable unsaturated group include a vinyl group and a (meth)acryloyl group.

The proportion of the hydroxyl group-containing monomer in preparing the acrylic polyol is preferably 0.5 to 50% by weight based on the total amount of the monomer components. Within such a range, an appropriate crosslinking reaction can be caused, and excellent coating film physical properties can be obtained.

The lower limit is more preferably 1.0% by weight, and still more preferably 5% by weight. The upper limit is more preferably 50% by weight, and still more preferably 40% by weight.

The hydroxyl value of the acrylic polyol is preferably 1 to 200 mg KOH/g from the viewpoint of water resistance of the formed coating film and the like. The lower limit is more preferably 2 mg KOH/g, and still more preferably 5 mg KOH/g. The upper limit is more preferably 180 mg KOH/g, and still more preferably 170 mg KOH/g.

As the acrylic polyol, commercially available one can also be used. Commercial ones are not particularly limited, and for example, ACRYDIC A-801-P, A-817, A-837, A-848-RN, A-814, 57-773, A-829, 55-129, 49-394-IM, A-875-55, A-870, A-871, A-859-B, 52-668-BA, WZU-591, WXU-880, BL-616, CL-1000, CL-408, and the like manufactured by DIC Corporation.

(O-2) Polyester Polyol

The polyester polyol can usually be produced by an esterification reaction or a transesterification reaction of an acid component and an alcohol component.

As the above-mentioned acid component, a compound which is ordinarily used as an acid component in the production of a polyester resin can be mentioned. Examples of the acid component include aliphatic polybasic acids, alicyclic polybasic acids, aromatic polybasic acids and the like, and anhydrides and esterified products thereof.

As the above aliphatic polybasic acid, and anhydride and esterified product thereof, aliphatic compounds having two or more carboxyl groups in one molecule, an acid anhydride of the aliphatic compound and an esterified product of the aliphatic compound are generally mentioned, for example, aliphatic polyvalent carboxylic acids such as succinic acid, glutaric acid, adipic acid, pimelic acid, suberic acid, azelaic acid, sebacic acid, undecane diacid, dodecanedioic acid, brassylic acid, octadecanedioic acid, citric acid, and butanetetracarboxylic acid;
anhydrides of the above aliphatic polyvalent carboxylic acids;
esterified products of lower alkyl having about 1 to about 4 carbon atoms of the aliphatic polyvalent carboxylic acid, and the like, and any combinations thereof may be mentioned.

The aliphatic polybasic acid is preferably adipic acid and/or adipic anhydride from the viewpoint of the smoothness of the coating film to be obtained.

The above-mentioned alicyclic polybasic acids, and their anhydrides and esterified products are generally compounds having one or more alicyclic structures and two or more carboxyl groups in one molecule, acid anhydrides of the above compounds and esterified products of the above compounds. The alicyclic structure is mainly a 4- to 6-membered ring structure. Examples of the alicyclic polybasic acid and anhydride and esterified product thereof include the alicyclic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid and the like;

anhydrides of the alicyclic polyvalent carboxylic acids; esterified products of the lower alkyl having about 1 to about 4 carbon atoms of the alicyclic polyvalent carboxylic acid, and the like; and any combinations thereof may be mentioned.

From the viewpoint of the smoothness of the coating film to be obtained, it is preferable to use 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid and 4-cyclohexene-1,2-dicarboxylic anhydride, and 1,2-cyclohexane dicarboxylic acid and/or 1,2-cyclohexanedicarboxylic anhydride is more preferable.

Above aromatic polybasic acid and their anhydride and esterified product may generally include aromatic polyvalent carboxylic acids such as an aromatic compound having two or more carboxyl groups in one molecule, an acid anhydride of the aromatic compound and an esterified product of the aromatic compound including phthalic acid, isophthalic acid, terephthalic acid, naphthalene dicarboxylic acid, 4,4'-biphenyl dicarboxylic acid, trimellitic acid, pyromellitic acid and the like; acid anhydride of the aromatic polyvalent carboxylic acid, esterified products of lower alkyl having about 1 to about 4 carbon atoms of the aromatic polyvalent carboxylic acid, and the like, and any combinations thereof. As above aromatic polybasic acid and their anhydride and esterified product, phthalic acid, phthalic anhydride, isophthalic acid, trimellitic acid, and trimellitic anhydride are preferable.

Further, as the acid component, acid components other than the aliphatic polybasic acid, the alicyclic polybasic acid and the aromatic polybasic acid, for example, fatty acids such as coconut oil fatty acid, cottonseed oil fatty acid, hemp oil fatty acid, rice bran oil fatty acid, fish oil fatty acid, Tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid etc.; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, 10-phenyloctadecanoic acid and the like;

hydroxy carboxylic acids such as lactic acid, 3-hydroxybutanoic acid, 3-hydroxy-4-ethoxybenzoic acid, and the like, and any combination thereof may be mentioned.

As the alcohol component, a polyhydric alcohol having two or more hydroxyl groups in one molecule may be used. The polyhydric alcohol may include, for example, dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butane diol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F, and dimethylolpropionic acid;

polylactone diol obtained by adding a lactone compound such as ε-caprolactone to the dihydric alcohol;

ester diol compounds such as bis (hydroxyethyl) terephthalate;

polyether diol compounds such as alkylene oxide adducts of bisphenol A, polyethylene glycol, polypropylene glycol and polybutylene glycol;

trihydric or higher alcohol such as glycerin, trimethylolethane, trimethylolpropane, diglycerin, triglycerin, 1,2,6-hexanetriol, pentaerythritol, dipentaerythritol, tris (2-hydroxyethyl) isocyanuric acid, sorbitol, and mannitol;

a polylactone polyol compound obtained by adding a lactone compound such as ε-caprolactone to the trihydric or higher alcohol;

fatty acid esterified products of glycerin, and the like.

As the above-mentioned alcohol component, an alcohol component other than the polyhydric alcohol, for example, a monoalcohol such as methanol, ethanol, propyl alcohol, butyl alcohol, stearyl alcohol or 2-phenoxyethanol; and an alcohol compound obtained by reacting a monoepoxy compound such as propylene oxide, butylene oxide, "Cardura E10" (trade name, glycidyl esters of synthetic hyperbranched saturated fatty acids, manufactured by HEXION Specialty Chemicals, Inc.) with an acid may be used.

The polyester polyol is not particularly limited, and it can be produced by a usual method. For example, the acid component and the alcohol component are heated in a nitrogen stream at about 150 to about 250° C. for about 5 to about 10 hours to carry out esterification reaction or transesterification reaction of the acid component and the alcohol component, thereby the polyester polyol can be produced.

The polyol of the present invention may contain both the above polyacrylic polyol and polyester polyol in combination.

(O-3) Low Molecular Weight Polyol

The above polyol is not limited to the above-mentioned resin, and a low molecular weight polyol (specifically, molecular weight of 2,000 or less) can also be used.

As the low molecular weight polyol, for example, dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butane diol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F, and dimethylolpropionic acid;

polylactone diol obtained by adding a lactone compound such as ε-caprolactone to the dihydric alcohol;

ester diol compounds such as bis(hydroxyethyl) terephthalate;

polyether diol compounds such as alkylene oxide adducts of bisphenol A, polyethylene glycol, polypropylene glycol and polybutylene glycol;

trihydric or higher alcohol such as glycerin, trimethylolethane, trimethylolpropane, diglycerin, triglycerin, 1,2,6-hexanetriol, pentaerythritol, dipentaerythritol, tris(2-hydroxyethyl) isocyanuric acid, sorbitol, and mannitol.

Such a low molecular weight polyol is known as a general purpose product and can be obtained at low cost. Further, the low molecular weight polyol has high water solubility and can be suitably used as a crosslinking agent in the case of curing in water-borne system. In recent years, environmental problems are attracting attention, and it can be suitably used as a very important crosslinking agent in promoting the reduction of VOC.

The form of the clear coating composition of the present invention is preferably an organic solvent-based form or a water-based form. This is preferable in that thin film coating can be performed and low-temperature curing can be performed. The water-based system may be water-soluble or water-dispersible, and it may contain an aqueous solvent that can be mixed with water at an arbitrary ratio such as ethanol, methanol, alcohol type, glycol type, ether type, ketone type or the like in addition to water.

The organic solvent-based clear coating composition is a composition in which the above components are dissolved or dispersed in various organic solvents. The organic solvent that can be used is not particularly limited, and examples thereof include hydrocarbons such as 1-hexane, 1-octane, 1-decane, 1-tetradecane, cyclohexane, benzene and xylene, ethers such as dimethyl ether and diethyl ether, ketones such as acetone, methyl ethyl ketone, and cyclohexanone, chlorinated hydrocarbons such as trichloromethane, carbon tetrachloride, dichloroethane, trichloroethane, tetrachloroethylene and the like, and any known ones such as ethanol, methanol, propanol, butanol, acetone, and the like.

Further, as a two-component clear coating composition, an alkyl ester group-containing component and a hydroxyl group-containing component may be combined and used by mixing them immediately before use.

The clear coating composition may further be used in combination with other crosslinking agents commonly used in the fields of coatings as long as the object of the present invention is not hindered. The crosslinking agent that can be used is not particularly limited, and examples thereof include an isocyanate compound, a blocked isocyanate compound, a melamine resin, an epoxy resin, an epoxy compound, a silane compound, and the like. In addition, vinyl ether, radical polymerizable monomer, etc. may be used in combination. A curing catalyst or a curing aid for accelerating the reaction of the used crosslinking agent may be used in combination. When a radical polymerizable compound is used in combination, a photopolymerization initiator, a thermal polymerization initiator and the like may be used in combination.

When the crosslinking agent commonly used in the fields of coatings is used in combination, the content thereof is preferably within the range of 0.01 to 50% by weight relative to the total weight of the crosslinking agent and the coating film-forming component. The lower limit is more preferably 0.01% by weight, and still more preferably 1% by weight. The upper limit is more preferably 30% by weight.

In addition to each of the above-described components, additives commonly used in the coating material field may be used in combination in the clear coating composition. For example, coloring pigments, extender pigments and the like, and any combination thereof may be used in combination.

Examples of the coloring pigment include titanium oxide, zinc white, carbon black, molybdenum red, prussian blue, cobalt blue, azo pigment, phthalocyanine pigment, quinacridone pigment, isoindoline pigment, threne pigment, perylene pigment, dioxazine type pigment, diketopyrrolopyrrole type pigment, and the like, and any combination thereof.

Examples of the extender pigment include clay, kaolin, barium sulfate, barium carbonate, calcium carbonate, talc, silica, alumina white and the like, and barium sulfate and/or talc is preferable, and barium sulfate is more preferable.

If desired, the clear coating composition may further contain an additive for coating such as a thickener, an ultraviolet absorber, a light stabilizer, an antifoaming agent, a plasticizer, an organic solvent other than the hydrophobic solvent, a surface conditioner, an anti-settling agent, and the like.

Examples of the thickener include inorganic thickeners such as silicate, metal silicate, montmorillonite, colloidal alumina and the like; polyacrylic acid thickeners such as copolymers of (meth)acrylic acid and (meth)acrylic acid ester, and sodium polyacrylate;

associative type thickener having a hydrophilic part and a hydrophobic part in one molecule and showing a thickening effect by an adsorption of the hydrophobic portion on the surface of the pigment or emulsion particle in the coating, or an association of the hydrophobic parts, in an aqueous medium;

cellulose derivative thickeners such as carboxymethylcellulose, methylcellulose, hydroxyethylcellulose and the like; protein type thickeners such as casein, sodium caseinate, ammonium caseinate and the like alginic acid thickeners such as sodium alginate; polyvinyl thickeners such as polyvinyl alcohol, polyvinyl pyrrolidone, polyvinyl benzyl ether copolymers; polyether thickeners such as pluronic polyethers, polyether dialkyl esters, polyether dialkyl ethers, polyether epoxy modified products and the like;

maleic anhydride copolymer type thickener such as a partial ester of vinyl methyl ether-maleic anhydride copolymer; polyamide type thickeners such as a polyamide amine salt, etc., and any combination thereof.

The polyacrylic acid thickener is commercially available, and examples thereof include "ACRYSOLASE-60", "ACRYSOLTT-615", and "ACRYSOLRM-5" (trade names) manufactured by Rohm and Haas Company, and "SN Thickener 613", "SN Thickener 618", "SN Thickener 630", "SN Thickener 634", and "SN Thickener 636" (trade names) manufactured by San Nopco CO., LTD.

The associative type thickener is commercially available, and examples thereof include "UH-420", "UH-450", "UH-462", "UH-472", "UH-540", "UH-752", "UH-756VF", and "UH-814N" (trade names) manufactured by ADEKA Corporation, "ACRYSOLRM-8W", "ACRYSOLRM-825", "ACRYSOLRM-2020NPR", "ACRYSOLRM-12W", and "ACRYSOLSCT-275" (trade names) manufactured by Rohm and Haas Company, "SN Thickner 612", "SN Thickener 621 N", "SN Thickener 625 N", "SN Thickener 627 N", and "SN Thickener 660 T" (trade names) manufactured by SAN NOPCO CO., LTD. and the like.

The above-mentioned polyamide thickeners are commercially available, for example, "FLOWNON HR-2", "FLOWNON HR-2G", "FLOWNON SH-290", "FLOWNON SH-350" and the like manufactured by Kyoeisha Chemical Co., Ltd. can be mentioned.

(Base Coating Composition)

The present invention is a method for forming a multilayer coating film comprising a step of applying a base coating composition and a step of applying a clear coating composition. The coating method here is not particularly limited, but a method for forming a multilayer coating film of 2 coats/1 bake comprising a step of applying the clear coating composition after performing the coating with the base coating composition in a wet-on-wet manner and a step of simultaneously curing the formed uncured multilayer coating film, or a method for forming a multilayer coating film of 3 coats/1 bake comprising a step of applying the first base coating composition, the second base coating composition and the above-described clear coating composition in a wet-on-wet manner, and a step of simultaneously curing the formed uncured multilayer coating film may be used.

Also, a method comprising curing the base coating film after applying the base coating composition, and then curing a base coating film after applying the clear coating composition on the cured coating film.

Although it can be applied to any of the above-mentioned methods, the method of applying the base coating composition and the clear coating composition in a wet-on-wet manner is particularly preferable because it is simple in the process, and is generally used in fields such as automotive coating. In such a method, problems such as a mixed layer between coating films and curing defects due to volatile components are likely to occur. However, when the above-described clear coating composition is used, such a wet-on-wet coating can be performed without any problem.

The base coating composition used here is not particularly limited, but specific examples thereof will be described below in detail.

(Resin Composition of Base Coating Composition)

The Case that the Base Coating Composition is a Coating Composition Using a Transesterification Reaction as Curing Reaction (B-1)

In the present invention, the above-mentioned coating composition using a transesterification reaction as curing reaction may be applied as the base coating composition.

The coating composition using a transesterification reaction as curing reaction is inexpensive and has an excellent performance as described above, so the base coating composition may be the above-mentioned coating composition using a transesterification reaction as curing reaction.

In addition, by using the coating composition using a transesterification as curing reaction for both the base coating composition and the clear coating composition, the compositions of both can be made similar. In this case, the compatibility between the layers and the physical properties of the coating film can be improved. Further, the base coating composition can be a system that does not use a melamine resin, which is preferable in that the acid resistance can be further improved.

In the case where the coating composition using a transesterification reaction as curing reaction is used as the base coating composition, the composition of the coating film-forming component can be the same as the above-mentioned clear coating composition. In addition, the base coating composition may be solvent-based or water-based.

The case where the base coating composition is a coating composition using a transesterification reaction as curing reaction and a water-borne coating composition will be described in detail below.

As described above, in the field of coatings and adhesives, aqueousization is being promoted in order to reduce the burden on the environment. This aims at lowering the VOC by making it water-borne. According to the present invention, it is possible to make the resin composition water-borne, and to provide a thermosetting resin composition corresponding to such an object.

As a method for obtaining such a water-borne thermosetting resin composition, the following two methods are generally known.

(a) A method of making water-borne by using a water-soluble or water-dispersible component.

(b) A method of making water-borne by emulsifying a water-insoluble component in water with an emulsifier. Therefore, each of these methods will be described in detail.

Among the components contained in the water-borne thermosetting resin composition, some components may be made water-borne by the method (a), and the other components may be made water-borne by the method (b).

(a) A Method of Making Water-Borne by Using a Water-Soluble or Water-Dispersible Component.

This is a method of making water-borne by using water-soluble or water-dispersible organic components for forming a coating film. The method is preferable in that the coating composition without using a surfactant can be obtained.

The resin used in the above embodiment (a) is not particularly limited, but may be a resin having an acid group such as at least one functional group selected from the group of a carboxylic acid group, a sulfonic acid group, a sulfate group, and phosphate group, which is being made water-borne by neutralizing the acid group with ammonia and/or an amine compound to convert into a hydrophilic group.

The resin having an acid group can be obtained by performing a known polymerization reaction using a monomer having these functional groups at least partially in an organic solvent. Then, it can be neutralized by adding water and an amine and/or an ammonia to make it water-borne.

As described above, when making water-borne by neutralizing the acid group, among various resins, generally, an acrylic polymer, a polyester resin, and a urethane resin can be most preferably used. In order to introduce the functional group having an acidic group into the acrylic resin, it is preferable to carry out a polymerization reaction using a polymerizable monomer having an acid group as a part of the raw material.

In such a method, a monomer that can be used as a monomer having an acid group is not particularly limited, and a monomer to be used can be selected according to a resin type. For example, unsaturated group-containing carboxylic compounds such as (meth) acrylic acid, maleic acid, crotonic acid, β-carboxyethyl acrylate, toluenesulfonic acid, 2-acrylamido-2-methylpropanesulfonic acid, 2-methacryloxyethyl acid phosphate and the like.

In the above polymer, such an acid group is preferably introduced so that the resin acid value is in the range of 1 to 200. The lower limit of the acid value is preferably 5 and more preferably 10. The upper limit of the acid value is preferably 100, and more preferably 80.

Examples of the amine compound include tertiary amines such as triethylamine, tributylamine, dimethylethanolamine and triethanolamine; secondary amines such as diethylamine, dibutylamine, diethanolamine and morpholine; primary amines such as propylamine, ethanolamine and dimethylethanolamine; and quaternary ammoniums such as ammonia.

When the amine compound is used, the amount to be used is usually preferably in the range of 0.1 to 1.5 molar equivalents relative to the carboxyl group in the unsaturated carboxylic acid or acid anhydride-modified polyolefin (i).

In the case of making water-borne by the above-mentioned method, after obtaining a resin by a method such as ordinary solution polymerization, it can be carried out by adding water and an amine compound and stirring.

(b) A Method of Making Water-Borne by Emulsifying a Component in Water with an Emulsifier Unlike those described above, the resin may be made water-soluble by emulsifying it with an emulsifier.

In this case, the resin may be one obtained by emulsion polymerization, or one obtained by emulsifying a resin obtained by solution polymerization or the like with an emulsifier. Further, as the emulsifier, a reactive emulsifier may be used.

Examples of the anionic reactive emulsifier include a sodium salt and an ammonium salt of a sulfonic acid compound having a polymerizable unsaturated group such as a (meth)allyl group, a (meth)acryl group, a propenyl group, and a butenyl group. Among these, an ammonium salt of a sulfonic acid compound having a polymerizable unsaturated group is preferable because the obtained coating film has excellent water resistance. Examples of commercially available products of the ammonium salt of the sulfonic acid compound include LATEMUL S-180A (trade name, manufactured by Kao Corporation).

Also, among the ammonium salts of the sulfonic acid compound having a polymerizable unsaturated group, an ammonium salt of a sulfonic acid compound having a polymerizable unsaturated group and a polyoxyalkylene group is more preferable. Examples of commercially available products of the ammonium salt of the sulfate compounds having a polymerizable unsaturated group and a polyoxyalkylene group include, for example, Aquaron KH-10 (trade name, manufactured by Daiichi Kogyo Seiyaku Co., Ltd.), SR-1025A (trade name, manufactured by Asahi Denka Kogyo Co., Ltd.).

The concentration of the emulsifier is usually preferably in the range of 0.1 to 10% by weight, and particularly preferably 1 to 5% by weight, based on the total amount of the radical polymerizable unsaturated monomers to be used.

An emulsified resin obtained by emulsion polymerization using a reactive emulsifier has the advantage that no inconvenience caused by the presence of the emulsifier occurs because the emulsifier is incorporated in the resin. Therefore, in applications where the presence of an emulsifier is problematic, it is preferable to use an emulsified resin obtained by such a method.

Emulsifiers other than the reactive emulsifier include, for example, nonionic emulsifiers such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonyl phenyl ether, polyoxyethylene octyl phenyl ether, polyoxyethylene monolaurate, polyoxyethylene monostearate, polyoxyethylene monooleate, sorbitan monolaurate, sorbitan monostearate, sorbitan trioleate, polyoxymethylene sorbitan monolaurate, and so on; and anionic emulsifiers such as sodium salts and ammonium salts of alkylsulfonic acid, alkylbenzenesulfonic acid, alkylphosphoric acid, and so on. Further, a polyoxyalkylene group-containing anionic emulsifier having an anionic group and a polyoxyalkylene group such as a polyoxyethylene group, a polyoxypropylene group, and so on in one molecule, and a reactive anionic emulsifier having the anionic group and a polymerizable unsaturated group in one molecule may be used. These can be used alone or in combination of two or more.

The amount of the emulsifier to be used is usually preferably 30 parts by weight or less, particularly preferably 0.5 to 25 parts by weight, based on 100 parts by weight of the solid content of the unsaturated carboxylic acid or acid anhydride-modified polyolefin (i).

In addition, when the resin obtained by emulsion polymerization is used, the emulsion polymerization method is not particularly limited, and can be performed by a known general method. Further, the emulsifier may be the reactive emulsifier described above or a general emulsifier.

When the method of emulsifying the resin obtained by a general method such as a solution polymerization of an organic solvent with an emulsifier is used, the specific method is not particularly limited, and a known general method can be used. Examples of the emulsifier that can be used in this case include those described above as those that can be used for emulsion polymerization.

Also, when using various ester compounds or polyhydric alcohols insoluble in water as described in detail below, these compounds can be water-solubilized by applying known methods such as a method of emulsifying this with an emulsifier, or a method of solubilizing by using an organic solvent having high miscibility with water such as alcohol in addition to water. Examples of the organic solvent having high miscibility with water that can be used in such a method include methanol, ethanol, and butyl cellosolve.

When the Base Coating Composition is a Coating Composition Using a Known Thermosetting Resin Composition (B-2)

As the base coating composition, a general base coating composition used in a known method for forming a multilayer coating film may be used. Examples of such known base coating compositions include a system using an acrylic polyol or a polyester polyol as a main component, and a melamine resin or an isocyanate compound as a curing agent, and an acid-epoxy system having a curing reaction between an epoxy group and a carboxyl group.

In the method for forming a multilayer coating film of the present invention, the performance of the multilayer coating film may differ depending on the type of the melamine resin. As the melamine resin, it is particularly preferable to use a full ether type melamine resin.

The base coating composition may have both the functions (B-1) and (B-2) described above. That is, a curing system that causes a transesterification reaction may be a combination of a general curing agent such as a melamine resin and an isocyanate compound.

(About Form of Base Coating Composition)

The base coating composition as described above may be water-borne or solvent-based. Generally, a water-based base coating composition is often used as the base coating composition. On the other hand, the use of a solvent-based base coating composition is preferred because troubles in coating hardly occur and a multilayer coating film having good performance can be easily formed. In addition, many of the water-borne base coating compositions are generally made water-borne or hydrophilic by amine neutralizing the carboxylic acid. Similar amine salts may be used as pigment dispersants. These amines may act as a negative catalyst for the crosslinking of the clear coating composition by transesterification as in the present invention.

Therefore, when using such an amine, it is preferable to take measures as described in detail below.

When the Base Coating Composition is a Water-Borne Base Coating Composition (B-W)

In the field of automobile coating and the like, it is common practice to use a water-based coating composition as a base coating composition. This is performed for the purpose of reducing the used amount of VOC in response to environmental problems.

In the present invention, a water-based coating composition can also be used as the base coating composition. Any of the above-mentioned compositions (B-1) and (B-2) may be a water-based base coating composition. The case where a water-based coating composition is used as (B-1) has been described in detail in the above section (B-1). Hereinafter, the case where (B-2) is a water-based coating composition will be described in detail.

As the water-based base coating composition, one obtained by dissolving or dispersing in water by neutralizing a carboxyl group in a resin with an amine is generally used. At the time of curing, the amine component volatilizes.

In the case where the clear coating is performed in a wet-on-wet manner without performing the heat curing after performing the base coating as in the present invention, the components in the base coating film migrate and diffuse into the clear coating film layer. There is a possibility that such migrated and diffused components may affect the curability of the clear coating film. Particularly in a water-based base coating composition, an amine used as a neutralizing agent serves as a negative catalyst for a transesterification reaction in the clear coating composition due to its basicity. For this reason, it may be necessary to adjust the composition of the base coating composition in order to cope with such a problem.

When a melamine resin is used as a curing agent in a water-borne base coating composition, formaldehyde is generated by heating. This formaldehyde is a compound that immediately reacts with primary and secondary amines having active hydrogen to eliminate the basicity of the amine. Therefore, when a melamine resin is used, a reaction that deactivates the basicity of the amine occurs, whereby the problem of curing reaction inhibition in the clear coating composition by the amine can be solved.

The melamine-curable water-borne base coating composition is not particularly limited, and a known one can be used. Specifically, a coating composition containing an acrylic polyol resin and melamine can be mentioned. More specifically, the content of the melamine resin is preferably at least 5% by weight based on the total solid content of the water-borne base coating composition.

Furthermore, when the carboxyl group in the resin is neutralized with an amine, it is preferable to neutralize with a primary or secondary amine as the amine. This is preferred in that formaldehyde from the melamine resin can deactivate the basicity of the amine of the neutralizing agent. More specifically, the amines usable herein include monomethylamine, dimethylamine, monoethylamine, monoisopropylamine, diisopropylamine, butylamine, monoethanolamine, methylethanolamine, ethylethanolamine, mono-n-butylethanolamine, aminoethylpropanolamine, diethanolamine, monoisopropanolamine, diisopropanolamine, 2-aminomethylpropanol, morpholine, piperazine, and hydroxyethylpiperazine.

Further, when a water-borne base coating composition is used, the transesterification catalyst used in the clear coating composition is preferably a sulfonic acid compound. This is preferable in that transesterification is efficiently performed and a cured film having extremely good film properties can be obtained.

By using the base coating composition using a transesterification reaction as the crosslinking reaction, the crosslinking speed at the time of baking of the base and clear layers is the same or close to that of the melamine crosslinking single system, and the crosslinking strain between the layers is less likely to occur, and better finishing can be expected.

When Base Coating Composition is Solvent-Based Resin Composition (B-S)

The base coating composition may be a solvent-based resin composition. That is, the solvent-based resin composition does not cause the various problems that occur in the above-mentioned water-borne base coating composition. Therefore, it is preferable in that a good multilayer coating film can be easily formed.

In this case, the composition of the base coating composition is not particularly limited, and a melamine-curable type, an isocyanate-curable type, and the like, which are well known as the base coating composition, can be used. Further, a coating composition using the above-mentioned transesterification reaction as curing reaction can be used as a base coating composition.

(Bright Pigment)

In the field of automotive top coating compositions, many metallic coatings in which a bright pigment is blended into a base coating composition are applied.

In the present invention, the bright pigment is not particularly limited, and a bright pigment known in the coatings field can be used. Specific examples include non-colored or colored metallic bright materials such as metals or alloys such as aluminum, aluminum oxide, copper, zinc, iron, nickel and tin. In addition, bright pigments include metal-deposited film flakes, mica, mica surface coated with a metal oxide, mica-like iron oxide, graphite pigments, and light interference pigments including hologram pigments. The shape of the bright pigment is not particularly limited, and may be further colored or may be treated with various surface treating agents, dispersants, and the like. These bright pigments can be used alone or in combination of two or more.

The bright pigment may be appropriately mixed with a dispersant and a dispersing resin, dispersed and formed into a paste, and then blended into a coating composition.

(Optional Component)

In addition to the bright pigment, the above-mentioned water-borne base coating composition may contain other bright pigments and pigments such as coloring pigments and extender pigments as necessary.

The water-borne base coating composition may further contain, if necessary, other additives for coating composition commonly used in the preparation of water-borne coating compositions, such as an ultraviolet absorber, a light stabilizer, a surface conditioner, polymer fine particles, a pigment dispersant, an anti-settling agent, a thickener, a defoaming agent, a curing catalyst, a deterioration inhibitor, and organic solvents.

Preferably, the water-borne base coating composition generally has a solid content of from 5 to 35% by weight, particularly from 10 to 25% by weight, from the viewpoint of the bright-looking of the formed coating film. Preferably, the water-borne base coating composition usually has a pH in the range of 7.0 to 9.0, particularly 7.5 to 8.5.

Further, two layers of base coating film may be present. In this case, the two layers may have the same resin composition or different resin compositions. Also, only one may be a water-borne coating composition, or both may be water-borne coating compositions. Further, both may be solvent-based coating compositions. However, it is most preferred that both are water-borne base coating compositions.

That is common that these are a first base having an intermediate coating function showing an excellent ultraviolet blocking ability and an excellent adhesion to an electrodeposition coating film surface, and a second base for imparting designability including aluminum, mica, coloring pigment and the like. After performing the first base coating, the second base coating is performed in a wet-on-wet manner, and then a preheating at 50 to 100° C. for 1 to 5 minutes is performed as necessary. Further, a clear coating is performed in a wet-on-wet manner. Finally, it is preferable to form a multilayer coating film by a three-coat one-bake process in which three uncured coating films are simultaneously thermally cured.

(Under Coating Composition and Intermediate Coating Composition)

The method for forming a multilayer coating film of the present invention is used for coating various substrates described in detail below. The object to which the method for forming a multilayer coating film of the present invention is applied may be one obtained by forming an under coating film or an under coating film and an intermediate coating film on a substrate. When the substrate is made of metal, it is preferable that a chemical conversion treatment such as a phosphate treatment, a chromate treatment, a metal oxide treatment, or the like be performed before forming the under coating film.

The under coating film is formed for the purpose of imparting an anticorrosion property, a rust prevention property, an adhesive property with a substrate, a concealability of unevens on the surface of the substrate (sometimes referred to as "underlayer concealability"), and the like. As the under coating composition used to form an under coating film, a known under coating composition can be used. For example, it is preferable to use a cationic electrodeposition coating composition and an anionic electrodeposition coating composition for a conductive substrate such as a metal. It is preferable to use a chlorinated polyolefin resin coating composition for a low-polar substrate such as polypropylene.

After application, the under coating composition may be cured by means such as heating or blowing, or may be dried to such an extent that it is not cured. When a cationic electrodeposition coating composition or an anionic electrodeposition coating composition is used as the under coating composition, it is preferable that the under coating film is cured by heating after the application of the under coating composition in order to prevent a mixed layer between the under coating film and the coating film formed subsequently on the under coating film, and form a multilayer coating film having excellent appearance.

In addition, the above-mentioned intermediate coating film is formed on the under coating film for the purpose of imparting an adhesive property with the under coating film, a concealability of the under coating film color (sometimes called "color concealability"), a concealability of unevens on the surface of the under coating film, and a chipping resistance.

The intermediate coating film can be formed by applying an intermediate coating composition, and preferably, the film thickness of the cured film is usually in the range of 10 to 50 µm, and particularly preferably 15 to 30 µm.

As the intermediate coating composition, a known coating composition can be used. For example, an intermediate coating composition comprising a base resin such as a hydroxyl group-containing polyester resin or a hydroxyl group-containing acrylic resin as a vehicle component, and a crosslinking agent such as a melamine resin and a blocked polyisocyanate.

It is preferable to cure or touch-dry intermediate coating compositions after application by means such as heating or blowing because a mixed layer between the intermediate coating film and the coating composition to be subsequently applied on the intermediate coating film can be prevented and a multilayer coating film having an excellent appearance can be formed.

(Method for Forming Multilayer Coating Film)

In the present specification, the solid content of the base coating composition is a weight ratio of a non-volatile content after drying the water-borne base coating composition at 105° C. for 1 hour, and can be calculated from the difference between the weights of the coating compositions before drying and after drying. The drying process is performed in the following steps; about 2 g of the bright pigment-containing water-borne base coating composition is measured in an aluminum foil cup of about 5 cm in diameter, spreaded sufficiently on the bottom of the cup, and then dried at 105° C. for 1 hour.

The method of applying the bright pigment-containing water-borne base coating composition is not particularly limited, and examples thereof include methods such as air spray coating, electrostatic air spray coating, and electrostatic bell coating. A wet film can be formed on the object to be coated by these methods.

In the case of air spray coating, electrostatic air spray coating or electrostatic bell coating, the viscosity of the water-borne base coating composition is preferably adjusted to a viscosity range suitable for the coating, usually 15 to 60 seconds at 20° C. in a Ford cup #4 viscometer, by using water and/or an organic solvent.

Curing of the formed wet coating film can be performed by heating. The heating can be performed by known heating means, for example, using a drying furnace such as a hot blast furnace, an electric furnace, or an infrared induction heating furnace. The heating temperature is usually in the range of about 80 to about 180° C., and preferably about 120 to about 160° C. The heating time is not particularly limited, but can usually be about 10 to 40 minutes.

Suitably, the film thickness of the base coating film is usually in the range of 5 to 20 µm, and preferably 10 to 15 µm as a cured film thickness.

In addition, a multilayer coating film can be formed by a two-coat one-bake method in which a base coating composition is applied on an object to be coated, and a clear coating composition is applied thereon without curing the base coating film, and the base coating film and the clear coating film are simultaneously heated and cured. If the surface to be coated is an uncured intermediate coating film surface, a three-coat one-bake method can be used.

When a multilayer coating film is formed by the two-coat one-bake method, from the viewpoint of preventing the occurrence of coating film defects such as repelling and so on, after the base coating composition is applied, a preheating is preferably performed at a temperature at which the coating film is not substantially cured. The preheating temperature can be generally about 50 to 100° C., and the preheating time can be about 1 to 10 minutes, and preferably about 2 to 5 minutes.

A multilayer coating film having an excellent appearance can be formed by heating at usually about 100 to about 180° C., preferably about 120 to about 160° C. for about 10 to 40 minutes and curing, after the clear coating composition is applied on the cured or uncured base coating film obtained as described above using a coater such as an electrostatic bell coater or an electrostatic air spray coater.

The object to which the thermosetting coating composition can be applied is not particularly limited, and examples thereof include an outer plate portion of an automobile body such as a passenger car, a truck, a motorcycle, and a bus; an automobile part; house electrical products such as a mobile phone, an audio device, etc., building materials, furniture, adhesives, film and glass coating agents, and the like. When used as an automotive coating, it can be used for the curing of an arbitrary layer such as an intermediate coating, a base coating and a clear coating.

The object to be coated may be one obtained by applying a surface treatment such as a phosphate treatment, a chromate treatment, a composite oxide treatment or the like to the metal surface of a metal material and a car body molded therefrom, or may be an object to be coated having a coating film.

As the above object to be coated having the coating film, there can be mentioned a substrate which is subjected to a surface treatment as desired and has an undercoating film formed thereon. In particular, a car body having an undercoating film formed by an electrodeposition coating composition is preferable, and a car body having an undercoating film formed by a cationic electrodeposition coating composition is more preferable.

The object to be coated may be one obtained by subjecting the surface of plastic such as plastic material and automobile part molded therefrom to surface treatment, primer coating or the like as desired. Further, the plastic material and the metal material may be combined.

The method of applying the base coating composition and the clear coating composition is not particularly limited, and examples thereof include an air spray coating, an electrostatic air spray coating, an electrostatic bell coating, a curtain coating and the like, and an electrostatic air spray coating, an electrostatic bell coating, and the like are preferable. By the above coating method, a wet coating film can be formed from each of the coating compositions described above.

The wet coating film can be cured by heating. The curing can be carried out by a known heating means, for example, a drying oven such as an air-heating furnace, an electric furnace, an infrared induction heating furnace or the like. The wet coating film is preferably cured by heating at a temperature in the range of about 80 to about 180° C., more preferably about 100 to about 170° C., and even more preferably about 120 to about 160° C., and preferably for about 10 to about 60 minutes, and more preferably for about 15 to about 40 minutes. It is also preferable in that it can cope with low temperature curing at 80 to 140° C. The present invention is also a multilayer coating film obtained in this way.

EXAMPLES

Hereinafter, the present disclosure will be explained with reference to examples. However, the present disclosure is not limited to these examples. In addition, "part(s)" means "part(s) by weight" in the examples.

Production Example 1

N-butyl methacrylate (Kyoeisha Chemical Co., Ltd., Light Ester NB) 200 parts, 125 parts of t-butyl methacrylate (Kyoeisha Chemical Co., Ltd., Light Ester TB), and 125 parts of hydroxyethyl methacrylate (Kyoeisha Chemical Co., Ltd., Light Ester HO-250) were mixed to prepare a monomer mixture solution, and 23 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 225 parts and 225 parts of propylene glycol monomethyl ether acetate were placed in a stirrable flask, and the monomer solution and the initiator solution were added dropwise while nitrogen was enclosed. The polymerization temperature at this time was 130° C. The dropwise addition was carried out for 2 hours, and further aging was carried out at 130° C. for 4 hours to obtain a polymer solution A.

Production Example 2

N-butyl methacrylate (Kyoeisha Chemical Co., Ltd., Light Ester NB) 75 parts, 75 parts of 2-ethylhexyl methacrylate, 150 parts of t-butyl methacrylate (Kyoeisha Chemical Co., Ltd., Light Ester TB), and 150 parts of hydroxyethyl methacrylate (Kyoeisha Chemical Co., Ltd., Light Ester HO-250) were mixed to prepare a monomer mixture solution, and 23 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 225 parts and 225 parts of propylene glycol monomethyl ether acetate were placed in a stirrable flask, and the monomer solution and the initiator solution were added dropwise while nitrogen was enclosed. The polymerization temperature at this time was 130° C. The dropwise addition was carried out for 2 hours, and further aging was carried out at 130° C. for 4 hours to obtain a polymer solution B.

Production Example 3

Ethylene glycol monoacetoacetate monomethacrylate 54 parts, 65 parts of t-butyl acrylate, 38 parts of potassium carbonate, 2 parts of 18-crown-6 ether and 119 parts of tetrahydrofuran were mixed and stirred at 50° C. for 3 hours. After completion of the reaction, cyclohexane and water were added and washed with water. The organic layer was neutralized with a saturated aqueous solution of ammonium chloride and washed twice with water, and the obtained organic layer was concentrated under reduced pressure to obtain a monomer A.

Production Example 4

N-butyl methacrylate (Kyoeisha Chemical Co., Ltd., Light Ester NB) 100 parts, 150 parts of monomer A, and 125 parts of 4-hydroxybuthyl acrylate were mixed to prepare a monomer mixture solution, and 19 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 190 parts and 190 parts of propylene glycol monomethyl ether acetate were placed in a stirrable flask, and the monomer solution and the initiator solution were added dropwise while nitrogen was enclosed. The polymerization temperature at this time was 110° C. The dropwise addition was carried out for 2 hours, and further aging was carried out at 110° C. for 4 hours to obtain a polymer solution C.

Production Example 5

N-butyl methacrylate (Kyoeisha Chemical Co., Ltd., Light Ester NB) 300 parts, and 150 parts of hydroxyethyl methacrylate (Kyoeisha Chemical Co., Ltd., Light Ester HO-250) were mixed to prepare a monomer mixture solution, and 23 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 225 parts and 225 parts of propylene glycol monomethyl ether acetate were placed in a stirrable flask, and the monomer solution and the initiator solution were added dropwise while nitrogen was enclosed. The polymerization temperature at this time was 130° C. The dropwise addition was carried out for 2 hours, and further aging was carried out at 130° C. for 4 hours to obtain a polymer solution D.

Production Example 6

N-butyl methacrylate (Kyoeisha Chemical Co., Ltd., Light Ester NB) 135 parts, 135 parts of t-butyl acrylate (Kyoeisha Chemical Co., Ltd., Light Acrylate TB), and 135 parts of hydroxyethyl methacrylate (Kyoeisha Chemical Co., Ltd., Light Ester HO-250), 20 parts of methyl methacrylate (Kyoeisha Chemical Co., Ltd., Light Ester A), and 12 parts of reactive emulsifier (Daiichi Kogyo Seiyaku Co., Ltd., Aquaron KH-10) were mixed to prepare a monomer mixture solution, and 10 parts of azobisisobutyronitrile as an initiator was dissolved in an isopropyl alcohol to prepare an initiator solution.

Isopropyl alcohol 530 parts was placed in a stirrable flask, and the monomer solution and the initiator solution were added dropwise while nitrogen was enclosed. The polymerization temperature at this time was 70° C. The dropwise addition was carried out for 2 hours, and further aging was carried out at 70° C. for 4 hours to obtain a polymer solution E. Further, the polymer solution was neutralized with 17 parts of 2-amine-2-methyl-1-propanol to make it water-soluble, so that arbitrary dilution with water was allowed.

Production Example 7

N-butyl methacrylate (Kyoeisha Chemical Co., Ltd., Light Ester NB) 240 parts, 105 parts of t-butyl acrylate (Kyoeisha Chemical Co., Ltd., Light Acrylate TB), and 110 parts of hydroxyethyl methacrylate (Kyoeisha Chemical Co., Ltd., Light Ester HO-250), and 15 parts of reactive emulsifier (Daiichi Kogyo Seiyaku Co., Ltd., Aquaron KH-10) were mixed. After mixing, 200 parts of ion exchange water was mixed and emulsified for 1 hour at room temperature using homomixer to prepare a monomer emulsion. Ammonium peroxodisulfate 15 parts and 10 parts of sodium bisulfite as an initiator were dissolved in ion exchange water to prepare an initiator solution.

Ion exchange water 900 parts and 15 parts of isopropyl alcohol were placed in a stirrable flask, and the monomer solution and the initiator solution were added dropwise while nitrogen was enclosed. The polymerization temperature at this time was 80° C. The dropwise addition was carried out for 2 hours, and further aging was carried out at 80° C. for 4 hours to obtain a polymer solution F.

TABLE 1

|  | Polymer A | Polymer B | Polymer C | Polymer D | Polymer E | Polymer F |
|---|---|---|---|---|---|---|
| Solid content | 50 | 50 | 50 | 50 | 45 | 30 |
| Mw | 6,400 | 6,100 | 11,500 | 10,000 | 12,000 | — |
| Mw/Mn | 1.83 | 1.89 | 2.55 | 1.89 | 1.91 | — |

The molecular weight was measured by gel permeation chromatography in terms of polystyrene.

Production Example 8

To a mixture of 17 parts of a black pigment (carbon black: Raven 5000UIII), 100 parts of isopropanol, and 10 parts of a dispersant (Kyoeisha Chemical Co., Ltd., FLOWLEN GW-1500), 100 parts of glass beads (particle diameter, 1.5 to 2.0 mm) was added and dispersed for 2 hours with a round shaker to prepare a pigment dispersion paste A.

Production Example 9

To a mixture of 17 parts of a black pigment (carbon black: Raven 5000UIII), 100 parts of water, 10 parts of a dispersant (Kyoeisha Chemical Co., Ltd., FLOWLEN GW-1500) and 0.6 part of a defoaming agent (Kyoeisha Chemical Co., Ltd., AQUALEN HS-01), 100 parts of glass beads (particle diameter, 1.5 to 2.0 mm) was added and dispersed for 2 hours with a round shaker to prepare a pigment dispersion paste B.

Production Example 10

According to the compositions in Table 2, clear coating compositions CC1 to CC4 and clear coating composition CC-M were prepared.

TABLE 2

|  | CC-M | CC1 | CC2 | CC3 | CC4 | CC5 |
|---|---|---|---|---|---|---|
| A-405 | 70 |  |  |  |  |  |
| NIKALAC MS-11 | 30 |  |  |  |  |  |
| Polymer solution A |  | 100 |  |  |  |  |
| Polymer solution B |  |  | 100 |  |  |  |
| Polymer solution C |  |  |  | 100 |  |  |
| Polymer solution D |  |  |  |  | 70 | 100 |
| DTBM |  |  |  |  | 30 |  |
| PHS |  | 1.5 | 1.5 | 1.5 | 1.5 | 1.5 |
| APX-4179C | 0.5 | 0.5 | 0.5 | 0.5 | 0.5 | 0.5 |
| FLOWLEN AC-224D | 0.5 | 0.5 | 0.5 | 0.5 | 0.5 | 0.5 |
| Tinuvin 384-2 | 1.75 | 1.75 | 1.75 | 1.75 | 1.75 | 1.75 |
| HOSTAVIN 3058LIQ | 0.83 | 0.83 | 0.83 | 0.83 | 0.83 | 0.83 |

A-405: ACRYDIC A-405 manufactured by DIC Corporation (Acrylic polyol resin)
NIKALAC MS-11: Melamine resin manufactured by Sanwa Chemical Co., Ltd.
DTBM: Di-t-butyl malonate
PHS: Phenolsulfonic acid
APX-4179C: Leveling agent manufactured by Kyoeisha Chemical Co., Ltd.
FLOWLEN AC-224D: Defoaming agent manufactured by Kyoeisha Chemical Co., Ltd.
Tinuvin 384-2: UV absorber manufactured by BASF
HOSTAVIN 3058LIQ: Light stabilizer manufactured by CLARIANT CHEMICALS Example A Solvent-Based Wet-On-Wet Each base coating composition was spray-coated on a 0.8 mm thick dull steel plate so as to have a film thickness of 20

μm after drying, and preheated at 80° C. for 5 minutes. Each clear coating composition was applied on the coating film in a wet-on-wet manner so as to have a film thickness of 40 μm after drying. After a setting time of 10 minutes, baking was performed at 140° C. for 30 minutes to form a clear coating film. The obtained coating film was subjected to a coating film condition evaluation, a xylene rubbing resistance test, and an acid resistance test. Table 3 shows the combinations of coating composition of each example and the evaluation results of the coating films. The base coating composition was prepared by the method described below.

(Preparation Method and Coating Method of Solvent-Based Base Coating Composition)

Base coating composition was prepared by mixing the composition as shown in Table 3, and diluting the mixture to 20 to 25 seconds in a Ford cup using T-SOL-100 as a diluting solvent for viscosity adjustment. After filtration with 400 mesh, spray coating was performed.

are clearly more improved than the prior art in terms of formalin-free, storage stability, and cost. Because there are applications where these properties are not important, such multilayer coating films are also superior to the prior art. This point is similarly determined in the following embodiments.

Example B Water-Based Wet-On-Wet

Each base coating composition was spray-coated on a 0.8 mm thick dull steel plate so as to have a film thickness of 20 μm after drying, and preheated at 80° C. for 5 minutes. Each clear coating composition was applied on the coating film in a wet-on-wet manner so as to have a thickness of 40 μm after drying. After a setting time of 10 minutes, baking was performed at 140° C. for 30 minutes to form a clear coating film. The obtained coating film was subjected to a coating film condition evaluation, a xylene rubbing resistance test,

TABLE 3

|  |  | Compar. Ex. 1 | Ex. 1 | Ex. 2 | Ex. 3 | Ex. 4 | Ex. 5 | Ex. 6 | Ex. 7 |
|---|---|---|---|---|---|---|---|---|---|
| Base coating composition (solvent-based) | Pigment paste A | 19 | 19 | 19 | 19 | 19 | 19 | 19 | 19 |
|  | A-322 | 70 | 70 | 70 | 70 |  |  |  | 50 |
|  | NIKALAC MS-11 (methyl) | 30 | 30 |  |  |  |  |  |  |
|  | U-VAN 20SB |  |  | 30 |  |  |  |  |  |
|  | NIKALAC MX 45 (full ether) |  |  |  | 30 |  |  |  | 30 |
|  | Polymer solution A |  |  |  |  | 70 | 70 | 70 | 20 |
|  | PHS |  |  |  |  | 2 | 2 | 2 | 2 |
|  | Thinner | 10 | 10 | 10 | 10 | 10 | 10 | 10 | 10 |
|  | Clear coating composition | CC-M | CC1 | CC1 | CC1 | CC1 | CC2 | CC3 | CC1 |
| Coating film property | Coating film condition | ○ | ○ | ○ | ○ | ◎ | ◎ | ◎ | ○ |
|  | Xylene rubbing | ◎ | Δ | ○ | ◎ | ◎ | ◎ | ◎ | ○ |
|  | Acid resistance | X | Δ | ○ | ○ | ◎ | ◎ | ◎ | ○ |

A-322: ACRYDIC A-322 manufactured by DIC Corporation (Acrylic polyol resin)
NIKALAC MS-11: Melamine resin manufactured by Sanwa Chemical Co., Ltd.
U-VAN 20SB: Melamine resin manufactured by Mitsui Chemical, Inc.
NIKALAC MX-45: Melamine resin manufactured by Sanwa Chemical Co., Ltd.
PHS: Phenolsulfonic acid In comparative example 1, the existing base coating composition and clear coating composition were cured with melamine resin, and the result was poor in acid resistance.

Further, form Examples 1 to 3, it was found that the type of the melamine resin in the base coating composition affected the crosslinking reaction of the clear coating composition. In particular, in this transesterification reaction, since the basic substance acts as a negative catalyst, it is necessary to confirm the influence of the type of the melamine resin, additives, and unreacted substances and the like.

Also, by changing the base coating composition to a curing system using transesterification, the reaction system became the same as the clear coating composition, and the reactivity and surface condition were clearly improved.

In addition, even in the case of the multilayer coating films of examples, there is a case where sufficient performance was not obtained in xylene rubbing and acid resistance. However, the above-mentioned coating compositions and an acid resistance test. Table 4 shows the combinations of coating composition of each example and the evaluation results of the coating films. The base coating composition was prepared by the method described below.

(Preparation Method of Water-Borne Base Coating Composition)

Base coating composition was prepared by mixing the composition as shown in Table 4, and diluting the mixture to 20 to 25 seconds in a Ford cup using T-SOL-100 as a diluting solvent for viscosity adjustment. After filtration with 400 mesh, spray coating was performed. Thereafter, preheating was performed at 80° C. for 10 minutes, and then a clear coating composition was spray-coated in the same manner. After leaving at room temperature for 5 minutes, baking was performed at 140° C. for 30 minutes.

TABLE 4

|  |  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Base coating composition (water-based) | Pigment paste B | 19 | 19 | 19 | 19 | 19 | 19 | 19 | 19 | 19 |
|  | ACD-2001 | 70 |  |  |  |  |  |  |  |  |
|  | NIKALAC MS-11 | 30 |  | 20 | 20 |  |  |  | 20 | 20 |
|  | Polymer solution E |  | 100 | 100 | 100 |  |  |  |  |  |
|  | Polymer solution F |  |  |  |  | 100 | 100 | 100 | 100 | 30 |
|  | AMP |  | 1.7 |  | 1.7 |  |  | 1.7 | 1.7 | 1.7 |
|  | 25% ammonia water |  |  |  |  |  | 0.7 |  |  |  |
|  | TEA |  |  | 1.7 |  |  |  |  |  |  |
|  | NACURE 5225 |  | 2.5 | 2.5 | 2.5 |  | 2.5 | 2.5 | 2.5 | 2.5 |
|  | PHS |  |  |  |  | 1.5 |  |  |  |  |
| Clear coating composition |  | CC2 | CC2 | CC2 | CC2 | CC2 | CC2 | CC2 | CC2 | CC2 |
| Coating film property | Coating film condition | ○ | ○ | ○ | ◎ | ○ | ○ | ○ | ◎ | ◎ |
|  | Xylene rubbing | Δ | Δ | Δ | ◎ | ◎ | ◎ | Δ | ◎ | ◎ |
|  | Acid resistance | Δ | Δ | Δ | ◎ | ◎ | ◎ | Δ | ◎ | ◎ |

ACD-2001: WATERSOL ACD-2001 manufactured by DIC Corporation
AMP: 2-amino-2-methyl-1-propanol
TEA: triethanolamine
NACURE 5225: thermal latent catalyst manufactured by Kusumoto Chemicals, Ltd.

In Examples 9 to 11, and 14 to 16, the curability of the clear coating compositions are inhibited by the effect of the base or amine contained in the base coating composition.

In particular, when a water-soluble base coating composition is used, the base resin is made water-borne by neutralizing a carboxylic acid-containing copolymer with an amine. The amine acts as a negative catalyst in the cross-linking reaction of the clear coating composition using a transesterification reaction. Therefore, it is clear that the use of a melamine resin in a part of the crosslinking reaction causes the generated formalin to react with the amine and loses the basicity, thereby enabling the reaction of the clear coating composition to be sufficiently performed. In Example 13, ammonia having a high volatility volatilized during baking, and thus did not cause an inhibition.

In examples 12 to 16, the polymer F synthesized by emulsion polymerization was used in a water-borne base coating composition. To be water-based is not affected by pH and does not require the combined use of amine and melamine resin. However, as shown in example 16, the surface condition of the base coating film is improved by using a high molecular weight resin and a low molecular weight resin in combination, and the surface condition of the clear coating film is also improved.

Example C Water Based Wet-On-Wet

Each base coating composition was spray-coated on a 0.8 mm thick dull steel plate so as to have a film thickness of 20 μm after drying, and preheated at 80° C. for 5 minutes. Each clear coating composition was applied on the coating film in a wet-on-wet manner so as to have a thickness of 40 μm after drying. After a setting time of 10 minutes, baking was performed at 140° C. for 30 minutes to form a clear coating film. The obtained coating film was subjected to a coating film condition evaluation, a xylene rubbing resistance test, and an acid resistance test. Table 5 shows the combinations of coating composition of each example and the evaluation results of the coating films. The base coating composition was prepared by the method described below.

Base coating composition was prepared by mixing the composition as shown in Table 4, and diluting the mixture to 20 to 25 seconds in a Ford cup using T-SOL-100 as a diluting solvent for viscosity adjustment. After filtration with 400 mesh, spray coating was performed.

TABLE 5

|  |  | Ex. 17 | Ex. 18 | Ex. 19 | Ex. 20 | Ex. 24 |
|---|---|---|---|---|---|---|
| Base coating composition (water-based) | Pigment paste B | 19 | 19 | 19 | 19 | 19 |
|  | NIKALAC MS-11 | 20 | 20 | 20 | 20 | 20 |
|  | Polymer solution E | 100 | 100 | 100 | 100 | 100 |
|  | AMP | 1.7 | 1.7 | 1.7 | 1.7 | 1.7 |
|  | NACURE 5225 | 2.5 | 2.5 | 2.5 | 2.5 | 2.5 |
| Clear coating composition |  | CC1 | CC2 | CC3 | CC4 | CC5 |
| Coating film property | Coating film condition | ◎ | ◎ | ◎ | ◎ | ○ |
|  | Xylene rubbing | ◎ | ◎ | ◎ | ◎ | Δ |
|  | Acid resistance | ◎ | ◎ | ◎ | ◎ | Δ |

In the above Examples 17 to 20, good results were obtained with clear coating compositions having various compositions. Further, in Example 24, the one using a primary ester in the ester portion was used for a clear coating composition, but the reactivity result was poor.

Production Example 11

Ethylene glycol monoacetoacetate monomethacrylate 54 parts, 58 parts of n-butyl acrylate, 38 parts of potassium carbonate, 2 parts of 18-crown-6 ether and 112 parts of tetrahydrofuran were mixed and stirred at 50° C. for 3 hours. After completion of the reaction, cyclohexane and water were added and washed with water. The organic layer was neutralized with a saturated aqueous solution of ammonium chloride and washed twice with water, and the obtained organic layer was concentrated under reduced pressure to obtain a monomer B.

Production Example 12

Ethylene glycol monoacetoacetate monomethacrylate 54 parts, 43 parts of methyl acrylate, 33 parts of potassium carbonate, 2 parts of 18-crown-6 ether and 97 parts of tetrahydrofuran were mixed and stirred at 50° C. for 3 hours. After completion of the reaction, cyclohexane and water were added and washed with water. The organic layer was neutralized with a saturated aqueous solution of ammonium chloride and washed twice with water, and the obtained organic layer was concentrated under reduced pressure to obtain a monomer C.

Production Example 13

2-ethylhexyl methacrylate 145 parts, 145 parts of monomer B, 150 parts of hydroxyethyl methacrylate (Kyoeisha Chemical Co., Ltd., Light Ester HO-250), and 120 parts of styrene were mixed to prepare a monomer mixture solution, and 25 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution.

Aromatic hydrocarbon (T-SOL 100) 250 parts and 250 parts of propylene glycol monomethyl ether acetate were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution G.

Production Example 14

2-ethylhexyl methacrylate 100 parts, 150 parts of monomer B, 120 parts of hydroxyethyl methacrylate (Kyoeisha Chemical Co., Ltd., Light Ester HO-250), and 120 parts of styrene were mixed to prepare a monomer mixture solution, and 25 parts of AIBN (azobisisobutyronitrile) as an initiator was dissolved in an aromatic hydrocarbon (T-SOL 100) to prepare an initiator solution.

Aromatic hydrocarbon (T-SOL 100) 250 parts and 250 parts of propylene glycol monomethyl ether acetate were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution H.

Production Example 15

2-ethylhexyl methacrylate 100 parts, 150 parts of monomer C, 120 parts of hydroxyethyl methacrylate (Kyoeisha Chemical Co., Ltd., Light Ester HO-250), and 120 parts of styrene were mixed to prepare a monomer mixture solution, and 25 parts of AIBN (azobisisobutyronitrile) as an initiator was dissolved in an aromatic hydrocarbon (T-SOL 100) to prepare an initiator solution.

Aromatic hydrocarbon (T-SOL 100) 250 parts and 250 parts of propylene glycol monomethyl ether acetate were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution I.

TABLE 6

|  | Polymer G | Polymer H | Polymer I |
| --- | --- | --- | --- |
| Solid content | 50 | 50 | 50 |
| Mw | 11000 | 8300 | 8900 |
| Mw/Mn | 2.67 | 1.90 | 1.96 |

The molecular weight was measured by gel permeation chromatography in terms of polystyrene.

Example D Water-Based Wet-On-Wet

Water-borne silver base coating composition (manufactured by Kansai Paint Co., Ltd.) was spray-coated on a 0.8 mm thick dull steel plate so as to have a film thickness of 20 μm after drying, and preheated at 80° C. for 5 minutes. Each clear coating composition was applied on the coating film in a wet-on-wet manner so as to have a thickness of 40 μm after drying. After a setting time of 10 minutes, baking was performed at 140° C. for 30 minutes to form a clear coating film. The obtained coating film was subjected to a coating film condition evaluation, a xylene rubbing resistance test, and an acid resistance test. Table 7 shows the combinations of coating composition of each example and the evaluation results of the coating films.

TABLE 7

|  |  | Ex. 21 | Ex. 22 | Ex. 23 |
| --- | --- | --- | --- | --- |
| Base coating composition (water-based) | Water-borne aluminum paste DMR D5660 | 20 | 20 | 20 |
|  | Isopropyl alcohol | 20 | 20 | 20 |
|  | WATERSOL S-727 | 33.3 | 33.3 | 33.3 |
|  | WATERSOL S-695 | 31.3 | 31.3 | 31.3 |
|  | WATERSOL ACD-2001 | 150 | 150 | 150 |
|  | Ion exchange water | 50 | 50 | 50 |
|  | DMEA | Predetermined amount (pH: 7.3) | | |
| Clear coating composition | Polymer solution G | 100 |  |  |
|  | Polymer solution H |  | 100 |  |
|  | Polymer solution I |  |  | 100 |
|  | NEOSTANN U-820 | 1.5 | 1.5 | 1.5 |
|  | APX-4288A | 0.5 | 0.5 | 0.5 |
| Coating film property | Coating film condition | ◎ | ◎ | ◎ |
|  | Xylene rubbing | ◎ | ◎ | ◎ |
|  | Acid resistance | ◎ | ◎ | ◎ |

Water-borne aluminum paste DMR-D5660: manufactured by Toyo Aluminium K. K.
WATERSOL S-727: manufactured by DIC Corporation
WATERSOL S-695: manufactured by DIC Corporation
WATERSOL ACD-2001: manufactured by DIC Corporation
DMEA: N, N-dimethyl-2-aminoethanol
NEOSTANN U-820: dioctyltin catalyst manufactured by Nitto Kasei Co., Ltd.
APX-4288A: leveling agent manufactured by Kyoeisha Chemical Co., Ltd.

In examples 21 to 23 described above, good results were obtained even on the water-borne base coating composition. Also, by using a metal catalyst, a favorably film could be obtained with primary to tertiary esters.

Example E Solvent-Based Base Coat Wet-On-Wet

Solvent-based base coating composition was spray-coated on a 0.8 mm thick dull steel plate so as to have a film thickness of 20 μm after drying, and preheated at 80° C. for 5 minutes. Each clear coating composition was applied on the coating film by wet-on-wet so as to have a thickness of 40 μm after drying. After a setting time of 10 minutes, baking was performed at 140° C. for 30 minutes to form a clear coating film. The obtained coating film was subjected to a coating film condition evaluation, a xylene rubbing resistance test, and an acid resistance test. Table 8 shows the combinations of coating composition of each example and the evaluation results of the coating films.

TABLE 8

| | | Ex. 25 | Ex. 26 | Ex. 27 |
|---|---|---|---|---|
| Base coating composition (solvent-based) | Pigment paste A | 19 | 19 | 19 |
| | ACRYDIC A-405 | 140 | 140 | 140 |
| | NIKALAC MS-45 | 30 | 30 | 30 |
| | NACURE 5225 | 12 | 12 | 12 |
| Clear coating composition | Polymer solution G | 100 | | |
| | Polymer solution H | | 100 | |
| | Polymer solution I | | | 100 |
| | NEOSTANN U-820 | 1.5 | 1.5 | 1.5 |
| | APX-4288A | 0.5 | 0.5 | 0.5 |
| Coating film property | Coating film condition | ◎ | ◎ | ◎ |
| | Xylene rubbing | ◎ | ◎ | ◎ |
| | Acid resistance | ◎ | ◎ | ◎ |

ACRYDIC A-405: acrylic polyol resin manufactured by DIC Corporation
NIKALAC MS-45: melamine resin manufactured by Sanwa Chemical Co., Ltd.
NACURE 5225: thermal latent catalyst manufactured by Kusumoto Chemicals, Ltd.
NEOSTANN U-820; dioctyltin catalyst manufactured by Nitto Kasei Co., Ltd.
APX-4288A: leveling agent manufactured by Kyoeisha Chemical Co., Ltd.

In examples 25 to 27 described above, good results were obtained even on the solvent-based base coating composition. Also, by using a metal catalyst, a favorably film could be obtained with primary to tertiary esters.

Production Example 16

N-butyl methacrylate (Kyoeisha Chemical Co., Ltd., Light Ester NB) 240 parts, 110 parts of hydroxyethyl methacrylate (Kyoeisha Chemical Co., Ltd., Light Ester HO-250) and 30 parts of styrene were mixed to prepare a monomer mixture solution, and 25 parts of 2,2'-azobis (2,4-dimethylvaleronitrile) (Wako Pure Chemical Industries, V-65) as an initiator was dissolved in an aromatic hydrocarbon (T-SOL 100) to prepare an initiator solution. Aromatic hydrocarbon (T-SOL 100) 250 parts and 250 parts of propylene glycol monomethyl ether acetate were placed in a stirrable flask, and the monomer solution and the initiator solution were added dropwise while nitrogen was enclosed. The polymerization temperature at this time was 100° C. The dropwise addition was carried out for 2 hours, and further aging was carried out at 100° C. for 4 hours to obtain a polymer solution J.

Production Example 17

Trimethylolpropane triacrylate 40 parts, 55 parts of dimethyl malonate, 56 parts of potassium carbonate, 1.5 parts of 18-crown-6 ether and 95 parts of tetrahydrofuran were mixed and stirred at 50° C. for 3 hours. After completion of the reaction, cyclohexane and water were added, and the mixture was washed with water. The organic layer was neutralized with a saturated aqueous solution of ammonium chloride and washed twice with water, and the obtained organic layer was concentrated under reduced pressure to obtain an ester compound A. The molecular weight of the ester compound A was 692.7.

Production Example 18

Dimethylol-tricyclodecane diacrylate 40 parts, 35 parts of dimethyl malonate, 56 parts of potassium carbonate, 1.5 parts of 18-crown-6 ether and 75 parts of tetrahydrofuran were mixed and stirred at 50° C. for 3 hours. After completion of the reaction, cyclohexane and water were added, and the mixture was washed with water. The organic layer was neutralized with a saturated aqueous solution of ammonium chloride and washed twice with water, and the obtained organic layer was concentrated under reduced pressure to obtain an ester compound B. The molecular weight of the ester compound B was 568.6.

Production Example 19

Trimethylolpropane triacrylate 40 parts, 76 parts of diisopropyl malonate, 56 parts of potassium carbonate, 1.5 parts of 18-crown-6 ether and 116 parts of tetrahydrofuran were mixed and stirred at 50° C. for 3 hours. After completion of the reaction, cyclohexane and water were added, and the mixture was washed with water. The organic layer was neutralized with a saturated aqueous solution of ammonium chloride and washed twice with water, and the obtained organic layer was concentrated under reduced pressure to obtain an ester compound C. The molecular weight of the ester compound C was 861.0.

Production Example 20

Trimethylolpropane triacrylate 40 parts, 88 parts of di-n-buthyl malonate, 56 parts of potassium carbonate, 1.5 parts of 18-crown-6 ether and 128 parts of tetrahydrofuran were mixed and stirred at 50° C. for 3 hours. After completion of the reaction, cyclohexane and water were added, and the mixture was washed with water. The organic layer was neutralized with a saturated aqueous solution of ammonium chloride and washed twice with water, and the obtained organic layer was concentrated under reduced pressure to obtain an ester compound D. The molecular weight of the ester compound D was 945.1.

Production Example 21

Dimethylol-tricyclodecane diacrylate 52 parts, 30 parts of dimethyl malonate, 56 parts of potassium carbonate, 1.5 parts of 18-crown-6 ether and 82 parts of tetrahydrofuran were mixed and stirred at 50° C. for 3 hours. After completion of the reaction, the precipitate was filtered and the obtained filtrate was concentrated under reduced pressure to obtain an ester compound E. The weight average molecular weight of the ester compound E was 1810.

Example F Water-Borne Base Coat Wet-On-Wet

Water-borne base coating composition was spray-coated on a 0.8 mm thick dull steel plate so as to have a film thickness of 20 μm after drying, and preheated at 80° C. for 5 minutes. Each clear coating composition was applied on the coating film by wet-on-wet so as to have a thickness of 40 μm after drying. After a setting time of 10 minutes, baking was performed at 140° C. for 30 minutes to form a clear coating film. The obtained coating film was subjected to a coating film condition evaluation, a xylene rubbing resistance test, and an acid resistance test. Table 9 shows the combinations of coating composition of each example and the evaluation results of the coating films.

TABLE 9

|  |  | Ex. 28 | Ex. 29 | Ex. 30 | Ex. 31 | Ex. 32 |
|---|---|---|---|---|---|---|
| Water-borne base coating composition | Water-borne aluminum paste DMR-D5660 | 20 | 20 | 20 | 20 | 20 |
|  | Isopropyl alcohol | 20 | 20 | 20 | 20 | 20 |
|  | WATERSOL S-727 | 33.3 | 33.3 | 33.3 | 33.3 | 33.3 |
|  | WATERSOL S-695 | 31.3 | 31.3 | 31.3 | 31.3 | 31.3 |
|  | WATERSOL ACD-2001 | 150 | 150 | 150 | 150 | 150 |
|  | Ion exchange water | 50 | 50 | 50 | 50 | 50 |
|  | DMEA | Predetermined amount (pH: 7.3) | | | | |
| Clear coating composition | Polymer solution J | 14 | 140 | 140 | 140 | 140 |
|  | Ester compound A | 30 |  |  |  |  |
|  | Ester compound E |  | 30 |  |  |  |
|  | Ester compound C |  |  | 30 |  |  |
|  | Ester compound D |  |  |  | 30 |  |
|  | Ester compound E |  |  |  |  | 30 |
|  | NEOSTANN U-820 | 1.5 | 1.5 | 1.5 | 1.5 | 1.5 |
|  | APX-4288A | 0.5 | 0.5 | 0.5 | 0.5 | 0.5 |
| Coating film property | Coating film condition | ◎ | ◎ | ◎ | ◎ | ◎ |
|  | Xylene rubbing | ◎ | ◎ | ◎ | ◎ | ◎ |
|  | Acid resistance | ◎ | ◎ | ◎ | ◎ | ◎ |

Water-borne aluminum paste DMR-D5660: manufactured by Toyo Aluminium K. K.
WATERSOL S-727: manufactured by DIC Corporation
WATERSOL S-695: manufactured by DIC Corporation
WATERSOL ACD-2001: manufactured by DIC Corporation
DMEA: N,N-dimethyl-2-aminoethanol
NEOSTANN U-820: dioctyltin catalyst manufactured by Nitto Kasei Co., Ltd.
APX-4288A: leveling agent manufactured by Kyoeisha Chemical Co., Ltd.

In examples 28 to 32 described above, good results were obtained even on the water-borne base coating composition. Even in the case of a mixture of an alkyl ester crosslinking agent and an acrylic polyol, a favorable film could be obtained with a primary to tertiary esters by using a metal catalyst.

Example G Solvent-Based Base Coat Wet-On-Wet

Solvent-based base coating composition was spray-coated on a 0.8 mm thick dull steel plate so as to have a film thickness of 20 μm after drying, and preheated at 80° C. for 5 minutes. Each clear coating composition was applied on the coating film by wet-on-wet so as to have a thickness of 40 μm after drying. After a setting time of 10 minutes, baking was performed at 140° C. for 30 minutes to form a clear coating film. The obtained coating film was subjected to a coating film condition evaluation, a xylene rubbing resistance test, and an acid resistance test. Table 10 shows the combinations of coating composition of each example and the evaluation results of the coating films.

TABLE 10

|  |  | Ex. 33 | Ex. 34 | Ex. 35 | Ex. 36 | Ex. 37 |
|---|---|---|---|---|---|---|
| Solvent-based base coating composition | Pigment paste A | 19 | 19 | 19 | 19 | 19 |
|  | ACRYDIC A-405 | 140 | 140 | 140 | 140 | 140 |
|  | NIKALAC MS-45 | 30 | 30 | 30 | 30 | 30 |
|  | NACURE 5225 | 12 | 12 | 12 | 12 | 12 |
| Clear coating composition | Polymer solution J | 140 | 140 | 140 | 140 | 140 |
|  | Ester compound A | 30 |  |  |  |  |
|  | Ester compound B |  | 30 |  |  |  |
|  | Ester compound C |  |  | 30 |  |  |
|  | Ester compound D |  |  |  | 30 |  |
|  | Ester compound E |  |  |  |  | 30 |
|  | NEOSTANN U-820 | 1.5 | 1.5 | 1.5 | 1.5 | 1.5 |
|  | APX-4288A | 0.5 | 0.5 | 0.5 | 0.5 | 0.5 |

TABLE 10-continued

|  |  | Ex. 33 | Ex. 34 | Ex. 35 | Ex. 36 | Ex. 37 |
|---|---|---|---|---|---|---|
| Coating film property | Coating film condition | ◎ | ◎ | ◎ | ◎ | ◎ |
|  | Xylene rubbing | ◎ | ◎ | ◎ | ◎ | ◎ |
|  | Acid resistance | ◎ | ◎ | ◎ | ◎ | ◎ |

ACRYDIC A-405: Acrylic polyol resin manufactured by DIC Corporation
NIKALAC MS-45: Melamine resin manufactured by Sanwa Chemical Co., Ltd.
NACURE 5225: thermal latent catalyst manufactured by Kusumoto Chemicals, Ltd.
NEOSTANN U-820: dioctyltin catalyst manufactured by Nitto Kasei Co., Ltd.
APX-4288A: leveling agent manufactured by Kyoeisha Chemical Co., Ltd.

In examples 33 to 37 described above, good results were obtained even on the solvent-based base coating composition. Even in the case of a mixture of an alkyl ester crosslinking agent and an acrylic polyol, a favorable film could be obtained with primary to tertiary esters by using a metal catalyst.

In addition, the coating film evaluations in the above tables were performed by the following methods.

Coating Film Condition

The surface condition of the baked coating film was visually observed.

◎: Glossy and smooth

○: Little orange peel is seen

Δ: Orange peel and foaming are seen, and there is no gloss x: There are no gloss and severe surface defects including unevenness, orange peel, and foaming Xylene Rubbing The coated plate after baking was rubbed 10 times with a pharmaceutical gauze impregnated with xylene. After the xylene was dried, the surface condition was visually observed.

◎: No change at all

○: Slightly scratched

Δ: Slightly dissolved
x: whitened and dissolved surface
Acid Resistance Test

A 40% sulfuric acid aqueous solution was dropped on the coated plate after baking, left at 60° C. for 1 hour, and then the sulfuric acid solution was wiped off, and the surface was polished lightly with an abrasive to observe the state.
◎: No change at all
○: Slightly outline of sulfuric acid was seen
Δ: Deteriorated and whitened coating film
x: Decomposition of the coating film, which clearly eroded into the inside of the coating film

INDUSTRIAL APPLICABILITY

The method for forming a multilayer coating film of the present invention can be used in coating various articles; an outer plate portion of an automobile body such as a passenger car, a truck, a motorcycle, a bus, etc.; an automobile part; home electric appliances such as a mobile phone, an audio equipment, etc.; building materials, furniture, an adhesive, a film and a glass coating agent.

The invention claimed is:

1. A method for forming a multilayer coating film comprising a step (1) of applying a base coating composition and a step (2) of applying a clear coating composition on a coating film formed in the step (1),
   wherein the clear coating composition causes a curing reaction through a transesterification reaction between a hydroxyl group and an alkyl ester group,
   wherein a component having alkyl ester groups contained in the clear coating composition comprises:
   (a) a polymer having at least one structural unit selected from a tert-butyl (meth) acrylate and an alkyl ester monomer having a structure represented by formula (2):

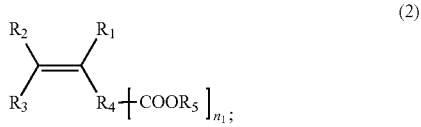

(2)

where $n_1$ is 1 to 10;
   $R_1$, $R_2$, and $R_3$ are the same or different, and each is hydrogen, an alkyl group, a carboxyl group, an alkyl ester group, or $R_4$—$[COOR_5]$, where $R_4$ is an aliphatic, an alicyclic, or an aromatic alkylene group having 50 or less atoms in the main chain; wherein the main chain, optionally, may have one or more functional groups selected from the group consisting of an ester group, an ether group, an amide group, and a urethane; and wherein the main chain may have a side chain;
   $R_5$ is an alkyl group having 50 or less carbon atoms; and/or
   (b) an alkyl ester compound obtained by an addition reaction of a compound having an active methylene group represented by formula (5) with a vinyl group:

(5)

where $R_{40}$ is a primary to tertiary alkyl group having 50 or less carbon atoms;
   X is an $OR_{40}$ group, or a hydrocarbon group having 5 or less carbon atoms; and
   when two $R_{40}$ groups are present in one molecule, $R_{40}$ may be identical or different.

2. The method according to claim 1, wherein the step (1) and the step (2) are carried out in a wet-on-wet manner, and wherein after the step (2), a step (3) of curing a base coating film layer and a clear coating film layer simultaneously is carried out.

3. The method according to claim 1, wherein a step (A) of curing a base coating film after the step (1) is carried out, and wherein a step (B) of curing a clear coating film after the step (2) is carried out.

4. The method according to claim 1, wherein the step (1) comprises a step (1-1) of applying a first base coating composition, and a step (1-2) of applying a second base coating composition in a wet-on-wet manner.

5. The method according to claim 1, wherein the base coating composition is a solvent-based base coating composition or a water-borne base coating composition.

6. The method according to claim 5, wherein the base coating composition is a water-borne base coating composition, and the water-borne base coating composition is obtained by using an amine, and/or an ammonia as a basic neutralizing agent to neutralize a resin with a base, and further contains a melamine resin.

7. The method according to claim 5, wherein the water-borne base coating composition contains the melamine resin in an amount of more than 5% by weight based on the solid content of the coating composition.

8. The method according to claim 1, wherein the alkyl ester monomer having the chemical structure represented by formula (2) has a chemical structure represented by formula (3):

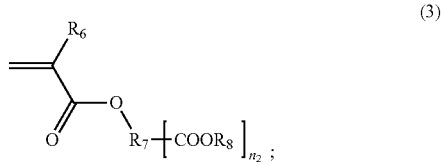

(3)

where:
   $n_2$ is 1 to 10;
   $R_6$ is H or a methyl group;
   $R_7$ is an alkylene group having 48 or less atoms in the main chain; wherein the main chain, optionally, may have a side chain, an ester group, an ether group, and/or an amide group; and
   $R_8$ is an alkyl group having 50 or less carbon atoms.

9. The method according to claim 8, wherein the alkyl ester monomer having the chemical structure represented by formula (3) has a chemical structure represented by formula (4):

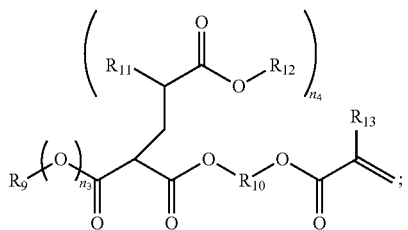 (4)

where:

$R_9$ is an alkyl group having 1 to 50 carbon atoms;

$R_{10}$ is an alkylene group with a number of atoms of 44 or less in the main chain, wherein the main chain, optionally, may have an ester group, an ether group, and/or an amide group; and wherein the main chain may have a side chain;

$R_{11}$ is H or a methyl group;

$R_{12}$ is an alkyl group having 50 or less carbon atoms;

$R_{13}$ is H or a methyl group;

$n_3$ is 0 or 1; and $n_4$ is 1 or 2.

10. The method according to claim 1, wherein the compound having an active methylene group represented by formula (5) is at least one of a malonic acid ester and an acetoacetic acid ester.

11. The method according to claim 1, wherein the vinyl group is derived from an acrylic acid derivative having two or more unsaturated bonds.

12. The method according to claim 1, wherein the base coating composition causes a curing reaction through a transesterification reaction.

* * * * *